United States Patent
Sundaram et al.

(10) Patent No.: US 10,326,674 B2
(45) Date of Patent: Jun. 18, 2019

(54) COMPRESSING TRACE DATA

(71) Applicant: Purdue Research Foundation, West Lafayette, IN (US)

(72) Inventors: Vinaitheerthan Sundaram, West Lafayette, IN (US); Patrick Eugster, West Lafayette, IN (US); Xiangyu Zhang, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 145 days.

(21) Appl. No.: 14/470,212

(22) Filed: Aug. 27, 2014

(65) Prior Publication Data

US 2015/0066881 A1    Mar. 5, 2015

Related U.S. Application Data

(60) Provisional application No. 61/870,457, filed on Aug. 27, 2013.

(51) Int. Cl.
*H04L 12/26* (2006.01)
*G06F 16/174* (2019.01)
(Continued)

(52) U.S. Cl.
CPC ........ *H04L 43/062* (2013.01); *G06F 11/3636* (2013.01); *G06F 16/1744* (2019.01);
(Continued)

(58) Field of Classification Search
CPC .......... G06F 17/30153; G06F 11/3636; H04L 43/062
See application file for complete search history.

(56) References Cited

U.S. PATENT DOCUMENTS 6,098,157 A    8/2000    Hsu et al.
6,115,393 A    9/2000    Engel et al.
(Continued)

OTHER PUBLICATIONS

Chang Hong Lin, Yuan Xie, Wayne Wolf, Oct. 10, 2007, IEEE Transaction on Very Large Scale Integration (VLSI) Systems vol. 15.*

(Continued)

*Primary Examiner* — Ashish Thomas
*Assistant Examiner* — Dustin D Eyers
(74) *Attorney, Agent, or Firm* — Lee & Hayes, P.C.; Christopher J. White

(57) ABSTRACT

Trace data are compressed by storing a compression table in a memory. The table corresponds to results of processing a set of training trace data using a table-driven compression algorithm. The trace data are compressed using the table according to the algorithm. The stored compression table is accessed read-only. The table can be determined by automatically processing a set of training trace data using the algorithm and transforming the compression table produced thereby into a lookup-efficient form. A network device includes a network interface, memory, and a processor that stores the table in the memory, compresses the trace data using the stored compression table according to the table-driven compression algorithm, the stored table being accessed read-only during the compressing, and transmits the compressed trace data via the network interface.

26 Claims, 15 Drawing Sheets

(51) Int. Cl.
*G06F 11/36* (2006.01)
*H04L 12/741* (2013.01)
*H04L 29/06* (2006.01)

(52) U.S. Cl.
CPC .............. *H04L 45/74* (2013.01); *H04L 69/04* (2013.01); *H04L 69/22* (2013.01)

(56) References Cited

U.S. PATENT DOCUMENTS

| | | | |
|---|---|---|---|
| 7,349,398 | B1 | 3/2008 | Favor et al. |
| 7,558,290 | B1 * | 7/2009 | Nucci ................... H03M 7/30 370/477 |
| 8,099,273 | B2 * | 1/2012 | Selvidge ............ G06F 17/5027 703/23 |
| 8,910,124 | B1 * | 12/2014 | Bhansali ................ G06F 11/34 717/127 |
| 2002/0095512 | A1 | 7/2002 | Rana et al. |
| 2004/0139090 | A1 * | 7/2004 | Yeh ......................... H03M 7/30 |
| 2004/0153520 | A1 | 8/2004 | Rune et al. |
| 2004/0213220 | A1 | 10/2004 | Davis |
| 2007/0028088 | A1 * | 2/2007 | Bayrak ............... H04L 63/0428 713/150 |
| 2007/0070916 | A1 | 3/2007 | Lehane et al. |
| 2008/0154999 | A1 * | 6/2008 | Sardana ................... G06F 1/03 708/277 |
| 2008/0184072 | A1 * | 7/2008 | Odlivak .............. G06F 11/3644 714/32 |
| 2009/0192711 | A1 * | 7/2009 | Tang ....................... E21B 47/12 702/6 |
| 2009/0262743 | A1 | 10/2009 | Uyehara et al. |
| 2010/0142422 | A1 | 6/2010 | Al-Wakeel et al. |
| 2010/0281051 | A1 * | 11/2010 | Sheffi ................. H04L 67/2819 707/770 |
| 2014/0330986 | A1 * | 11/2014 | Bowes .................... H04L 69/04 709/247 |
| 2015/0016555 | A1 | 1/2015 | Swope et al. |
| 2017/0207986 | A1 | 7/2017 | Sundaram et al. |

OTHER PUBLICATIONS

Office action for U.S. Appl. No. 14/470,112, dated Feb. 1, 2016, Sundaram et al., "Tracing Message Transmissions Between Communicating Network Devices", 8 pages.

"Datasheet TMS320F243, TMS320F241 DSP Controllers", Texas Instruments, Feb. 1999, pp. 1, 44, 78, 103. Retrieved Jul. 12, 2017 from <<http://www.alldatasheet.com/datasheet-pdf/pdf/29048/TI/TMS320F241.html>>. 116 pages.

Office Action for U.S. Appl. No. 15/473,046, dated Sep. 20, 2018, Vinaitheerthan Sundaram, et al., "Tracing Message Transmissions Between Communicating Network Devices", 43 pages.

* cited by examiner

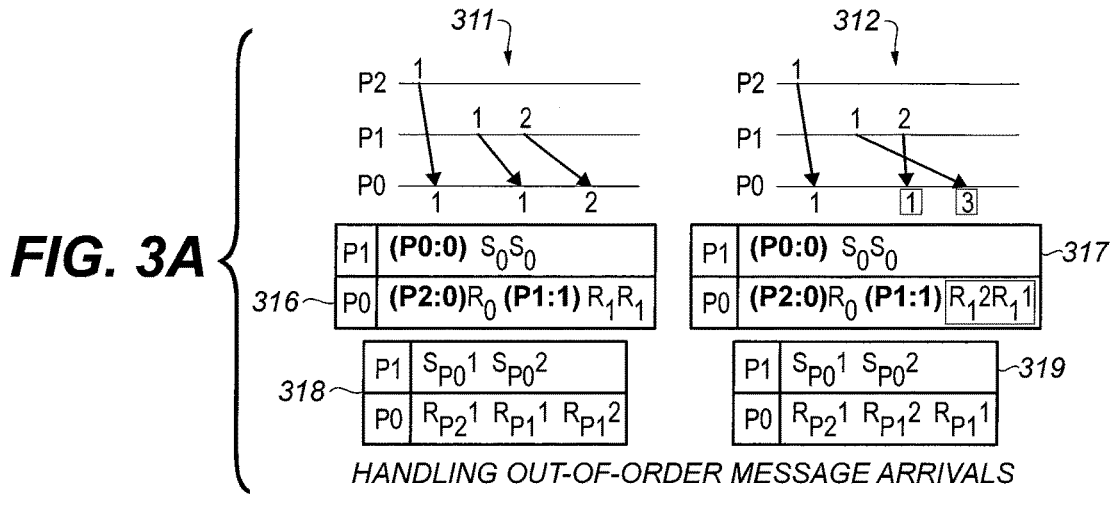
FIG. 3A — HANDLING OUT-OF-ORDER MESSAGE ARRIVALS
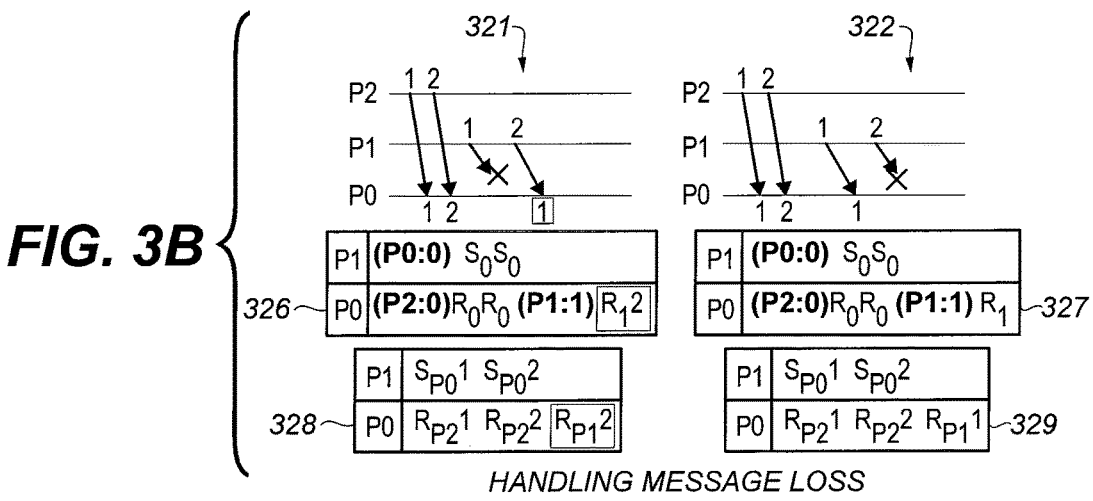
FIG. 3B — HANDLING MESSAGE LOSS
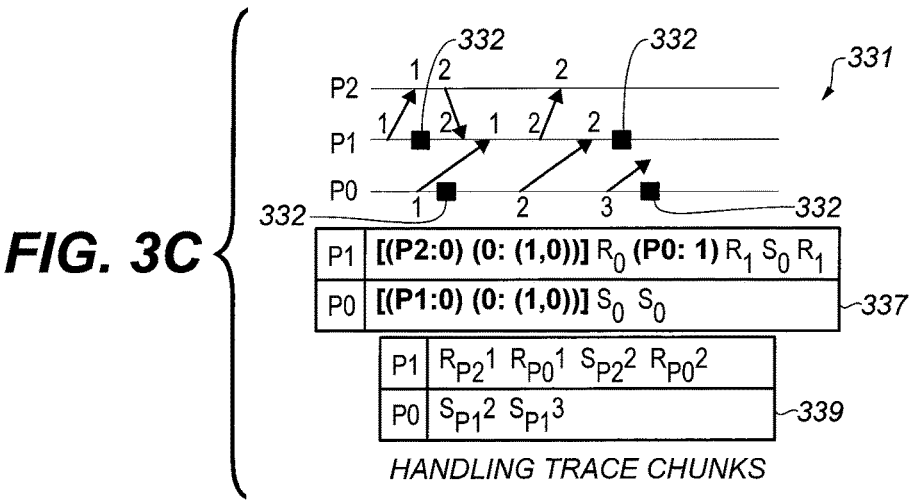
FIG. 3C — HANDLING TRACE CHUNKS

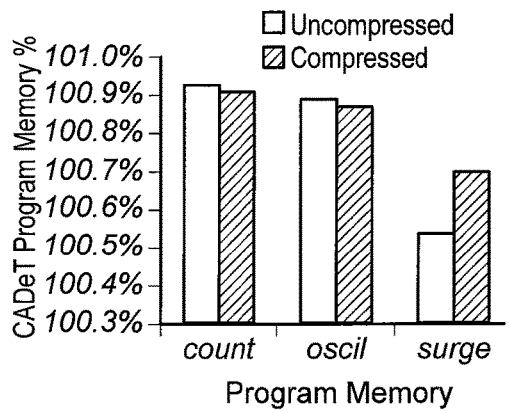
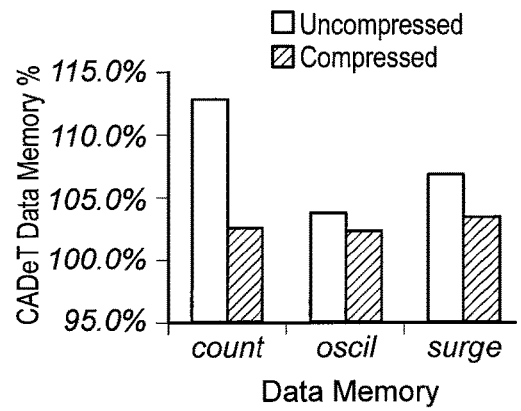
FIG. 7A  FIG. 7B
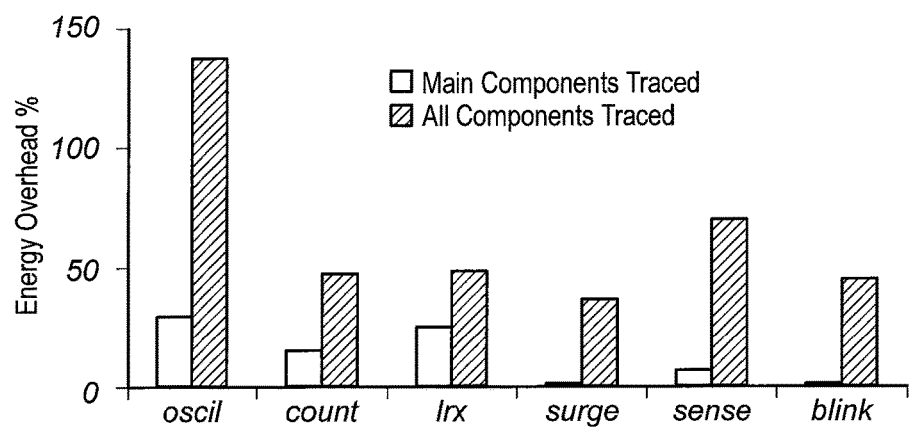
FIG. 8

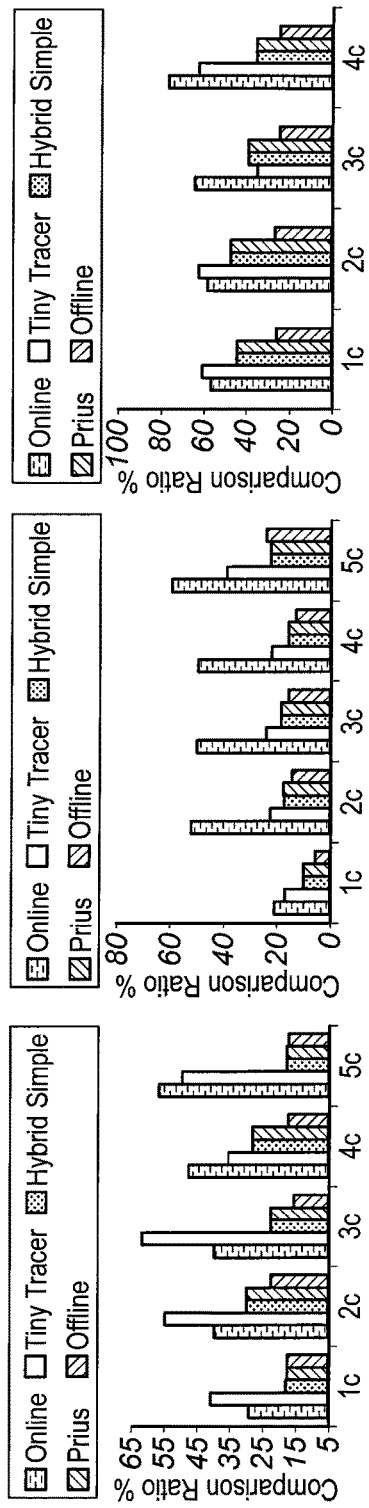
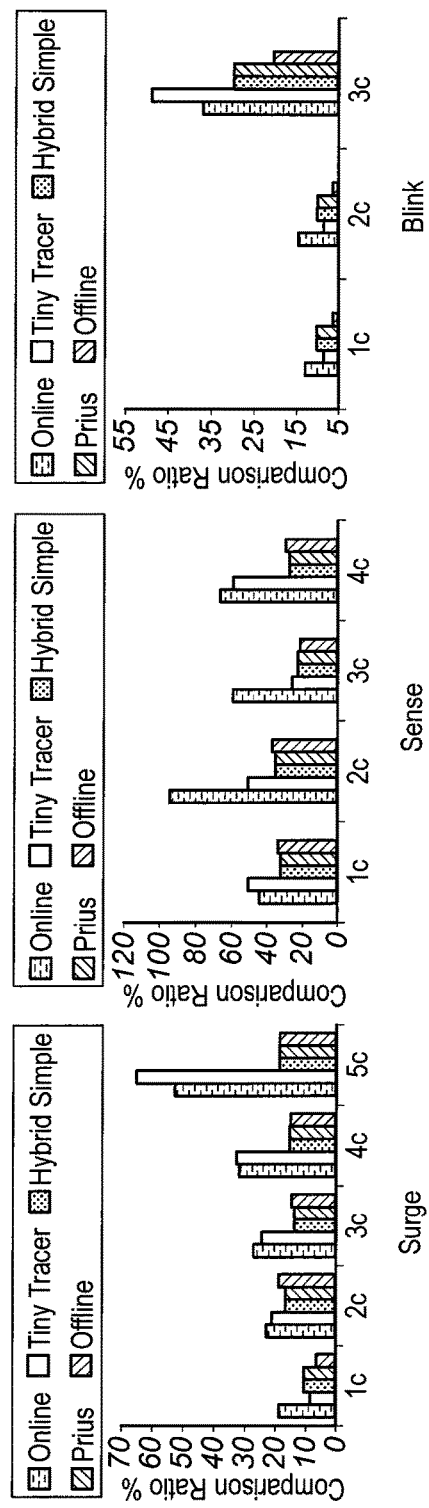
FIG. 12A  FIG. 12B  FIG. 12C
FIG. 12D  FIG. 12E  FIG. 12F

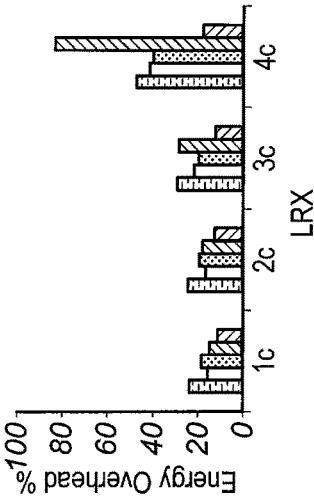
*FIG. 13A*
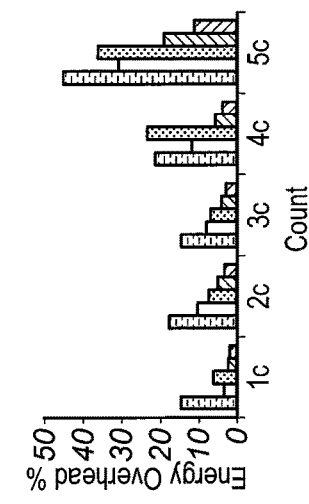
*FIG. 13B*
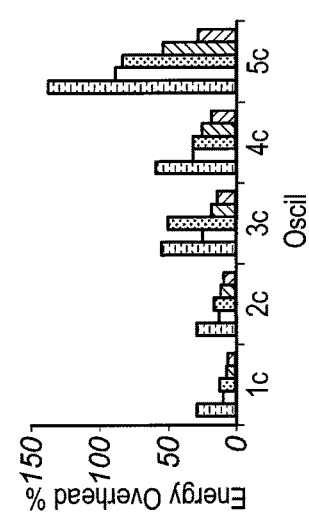
*FIG. 13C*
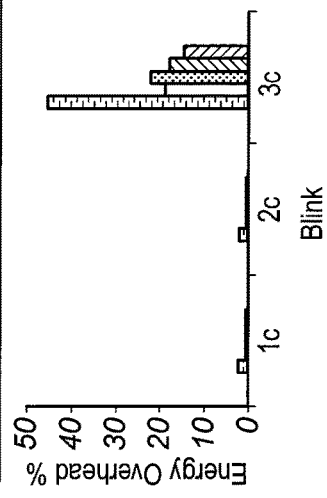
*FIG. 13D*
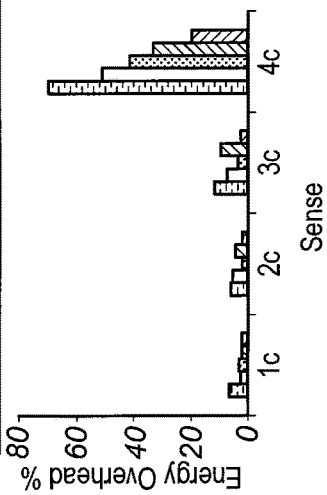
*FIG. 13E*
*FIG. 13F*

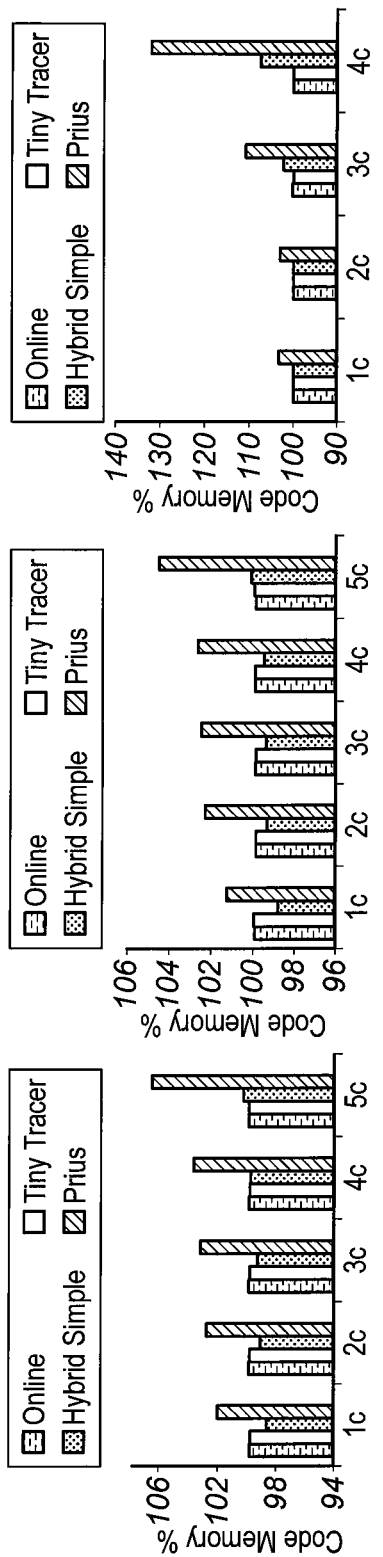
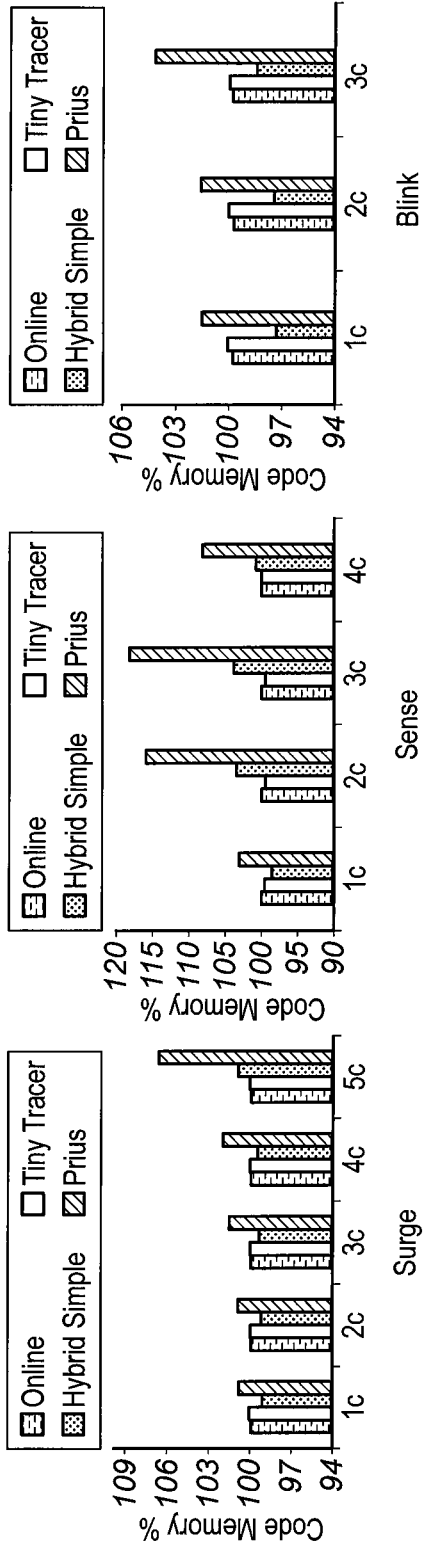
FIG. 14A  FIG. 14B  FIG. 14C
FIG. 14D  FIG. 14E  FIG. 14F

COMPRESSING TRACE DATA

CROSS-REFERENCE TO RELATED APPLICATIONS

This application is a nonprovisional application of, and claims the benefit of, U.S. Provisional Patent Application Ser. No. 61/870,457, filed Aug. 27, 2013 and entitled "NETWORK MESSAGE TRACING AND TRACE COMPRESSION," the entirety of which is incorporated herein by reference.

STATEMENT OF FEDERALLY SPONSORED RESEARCH OR DEVELOPMENT

This invention was made with government support under Contract No. CNS0834529 awarded by the National Science Foundation. The government has certain rights in the invention.

TECHNICAL FIELD

The present application relates to compressing trace data representing the runtime behaviour of a computing system such as a network node.

BACKGROUND

Networks contain communicating nodes. Networks can be wired or wireless, and communications between nodes can be unreliable. Failures in one node, e.g., due to software bugs or sequences of input that were not foreseen when node software was developed, can cause nodes to issue incorrect messages to other nodes, or to fail to issue correct messages to other nodes. This can result in cascading failure, as incorrect messages from one node cause other nodes to behave incorrectly. This problem can occur in any network-embedded system, i.e., any system including numerous intercommunicating processing elements.

This problem is particularly noticeable in wireless sensor networks (WSNs). Nodes in these networks are generally small and include low-power processors and sensors for measuring a characteristic of the node's immediate environment. Examples include temperature sensors and hazardous-gas sensors (e.g., carbon monoxide). Other examples of nodes are nodes attached to structural components of bridges or buildings to measure stress or strain of the component around the point of attachment of the node.

In order to debug failures observed in networks, e.g., WSNs, a helpful technique is to determine the sequence of node interactions prior to the failure. To this end, nodes can store a running log (e.g., in a circular buffer) of messages transmitted (TX) or received (RX). This log information, referred to as a "trace," can be collected from nodes after a failure occurs. Traces from numerous nodes can be compared and set in time order to determine the sequence of node interactions leading up to a failure.

Traces can store messages sent and received or other events. A trace can store the power used for each subsystem at various times, or external events detected by a sensor, or the flow of control through the software executing on a node. However, tracing may require large buffers, which small WSN nodes generally do not have room in memory to store. Various schemes attempt to use compression to fit more traces in a given buffer size. However, most conventional compression schemes use a large buffer to look for patterns across a large block of a dataset. WSN nodes do not generally have enough buffer space to use these techniques. Moreover, WSN nodes do not always have access to a global time reference, so combining traces from multiple nodes in the correct order can be challenging.

There is a need, therefore, for ways of compressing traces so that data can be effectively collected from network nodes, e.g., in support of failure diagnosis.

BRIEF DESCRIPTION

According to an aspect, there is provided a method of compressing a set of trace data, the method comprising automatically performing the following steps using a processor: storing a compression table in a memory, wherein the compression table corresponds to results of processing a set of training trace data using a table-driven compression algorithm; compressing the set of trace data using the stored compression table according to the table-driven compression algorithm, wherein the stored compression table is accessed in a read-only manner.

According to another aspect, there is provided a method of determining a compression table, the method comprising automatically performing the following steps using a processor: processing a set of training trace data using a table-driven compression algorithm, so that a compression table is produced; and transforming the compression table into a lookup-efficient form.

According to still another aspect, there is provided a network device, comprising: a network interface; and a memory; a processor adapted to: store a compression table in the memory, wherein the compression table corresponds to results of processing a set of training trace data using a table-driven compression algorithm; compress a set of trace data using the stored compression table according to the table-driven compression algorithm, wherein the stored compression table is accessed in a read-only manner during the compressing; and transmit the compressed trace data via the network interface.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIGS. 3A-3C show examples of tracing techniques according to various aspects herein;

FIGS. 7A and 7B show memory usage of CADeT (inventive) as a percentage of memory usage of Liblog (comparative);

FIG. 8 shows an example of energy overhead of uncompressed tracing according to a prior scheme;

FIGS. 12A-12F show compression ratios for exemplary compression algorithms according to various aspects;

FIGS. 13A-13F show energy overhead for exemplary compression algorithms according to various aspects;

FIGS. 14A-14F show program memory overhead for exemplary compression algorithms according to various aspects;

The attached drawings are for purposes of illustration and are not necessarily to scale.

DETAILED DESCRIPTION

Throughout this description, some aspects are described in terms that would ordinarily be implemented as software programs Those skilled in the art will readily recognize that the equivalent of such software can also be constructed in hardware, firmware, or micro-code. Because data-manipulation algorithms and systems are well known, the present description is directed in particular to algorithms and systems forming part of, or cooperating more directly with, systems and methods described herein. Other aspects of such algorithms and systems, and hardware or software for producing and otherwise processing signals or data involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

As used herein, the term "causality" refers to a temporal relationship between events, not necessarily a relationship in which one event is the exclusive cause or trigger of another event.

As used herein, the terms "we," "our," "mine," "I," and the like do not refer to any particular person, group of people, or entity.

Various problems are solved by aspects herein. One problem that is solved is the problem of placing the messages from the various traces in order. Another problem is that of compressing trace data so that the rolling log buffer can store data over a longer period of time.

Various techniques described herein can be used with various types of network nodes. Exemplary network nodes include embedded devices connected in an Internet of Things and wireless or wired sensors.

Various aspects herein include a tracing technique referred to as "CADeT" (Compression-Aware Distributed Tracing) that maintains an independent count of messages sent for each direction of message transfer between node pairs. This technique can be used with any reliable or unreliable transport, e.g., a WSN or a UDP connection over an IP link (wired or wireless). The term "CADeT" refers to a family of algorithms with similar features. Use of the term "CADeT" herein does not limit the scope of any claim to any particular combination of features described in association with that term.

Figure 1:
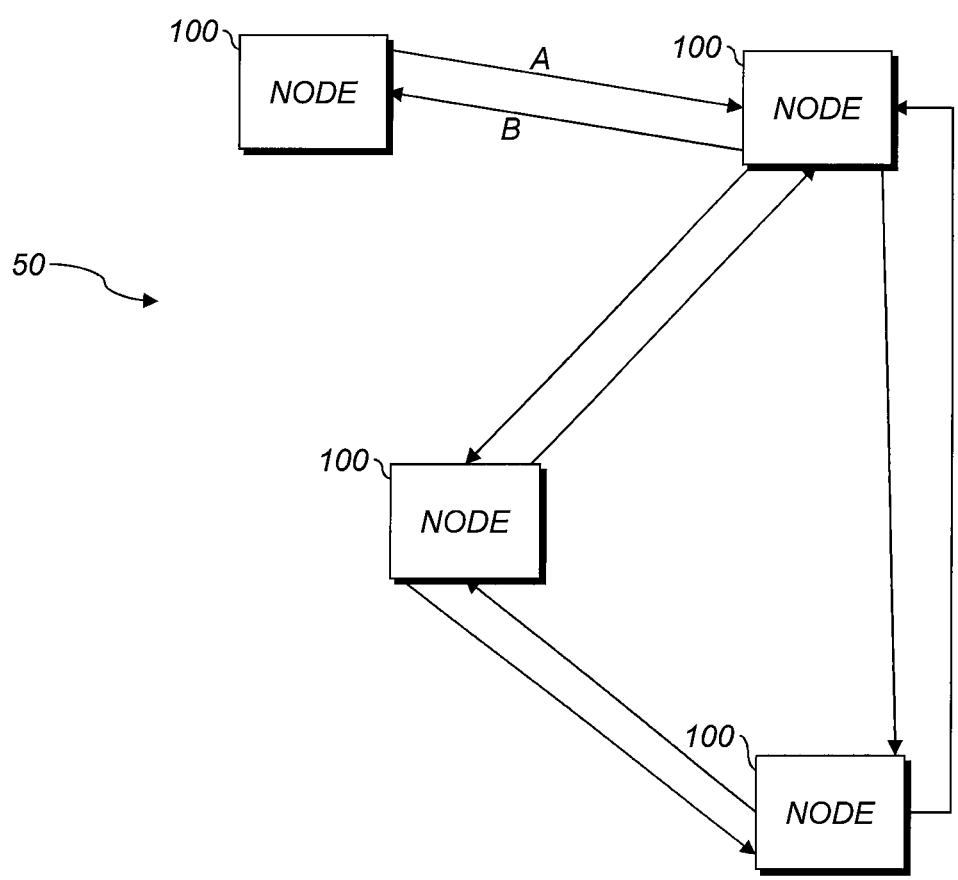
FIG. 1 shows a block diagram of an exemplary network.

FIG. 1 shows a schematic diagram of nodes 100 in a network 50. Nodes communicate with each other, as indicated by the arrows. CADeT can maintain a separate sequential count of messages sent along each arrow. For example, counts on links A and B are independent. Unlike prior schemes, various aspects described herein, especially those permitting message sends to be matched with their corresponding receive events from the traces alone, are robust in the presence of message drops, trace buffer restarts, or out-of-order arrivals. In aspects in which the counts are sequential, e.g., monotonically increasing or decreasing, better compression can be achieved than in systems using variable-stride counts. This is because the fixed increment has zero entropy and so does not need to be recorded in the trace buffer. Messages can be stored labeled with a unique node identifier (ID) or (to improve compression) a per-node alias for the unique node ID.

Prior schemes do not provide these advantages. Lamport clocks tick on events of interest, and nodes update each others' clocks by sending messages. However, Lamport clocks can be vulnerable to dropped messages or out-of-order arrivals and use variable stride, reducing compression efficiency. Vector clocks are complex and can be vulnerable to dropped messages or out-of-order arrivals.

One prior scheme is the Transmission Control Protocol (TCP), which uses sequence numbers to detect message drops or out-of-order receipt. TCP sequence numbers count the number of bytes sent to a partner in a single communication session. CADeT sequence numbers, in contrast, count the number of messages sent and received from each partner throughout the lifetime of the network instead of a single communication session. When the network link is lossy, TCP uses the same sequence number for bytes retransmitted but CADeT uses different sequence numbers for retransmitted messages, thus maintaining the ordering required to combine traces in order. TCP sequence numbers cannot differentiate sequential transmissions of the same data, so are not useful for identifying messages in a trace buffer (since a bug could be triggered by the retransmission but not the original message, or vice versa). The purpose of TCP sequence numbers is flow control, whereas the purpose of CADeT sequence numbers is to record a trace that enables reproduction of original message ordering and allow pairing of send events with their corresponding receive events.

Wireless sensor networks (WSNs) deployments are subjected not infrequently to complex runtime failures that are difficult to diagnose. Alas, debugging techniques for traditional distributed systems are inapplicable because of extreme resource constraints in WSNs, and existing WSN-specific debugging solutions address either only specific types of failures, focus on individual nodes, or exhibit high overheads hampering their scalability.

Message tracing is a core issue underlying the efficient and effective debugging of WSNs. We propose a message tracing solution which addresses challenges in WSNs—besides stringent resource constraints, these include out-of-order message arrivals and message losses—while being streamlined for the common case of successful in-order message transmission. Our approach reduces energy overhead significantly (up to 95% and on average 59% smaller) compared to state-of-the-art message tracing approaches making use of Lamport clocks. We demonstrate the effectiveness of our approach through case studies of several complex faults in three well-known distributed protocols.

Wireless sensor networks (WSNs) include many tiny, battery-powered sensor nodes equipped with wireless radios (a.k.a. motes) that sense the physical world and transmit the sensed information to a central "base station" computer via multi-hop wireless communication. Their small form factor and battery powered, wireless nature, makes WSNs suitable for a multitude of indoor and outdoor applications including environment monitoring (volcano, glacier), structural monitoring (bridges), border surveillance, and industrial machinery monitoring (datacenters).

With WSNs being increasingly deployed to monitor physical phenomena in austere scientific, military, and industrial domains, runtime failures of various kinds are observed in many deployments. In addition to node or link failures, failures engendered by complex interplay of software, infrastructure, and deployment constraints exhibiting as data races, timestamp overflows, transient link asymmetry, or lack of synchronization have been observed in distributed WSN protocols and applications. Unexpected environmental factors arising from in situ deployment constitute the major cause for runtime failures occurring in WSNs despite careful design and validation. Runtime debugging tools constitute a promising approach to detect and diagnose generic runtime failures in WSNs.

Runtime debugging is a challenging problem even in "traditional" resource-rich wireline networks. While online debugging techniques are useful in reducing the latency of fault detection and diagnosis, they tend to incur high runtime overhead and are susceptible to Heisenbugs (faults that disappear when the system is observed). Offline debugging techniques are inapplicable in WSNs as large amounts of data memory and non-volatile memory are required to store megabytes of traces generated for subsequent offline mining.

WSN-specific online debugging approaches focus on providing visibility into the network as well as remote control of it. While these approaches are very useful for small-scale testbeds, they are not suitable for debugging after deployment, as they are energy-inefficient and are highly susceptible to Heisenbugs due to non-trivial intrusion via computation and communication overheads. Several WSN-specific trace-based offline debugging techniques have thus been proposed. Some of these solutions focus on coarse-grained diagnosis, where the diagnosis pinpoints a faulty node or link, or network partition. Some approaches achieve automation but require multiple reproduction of failures to learn the correct behavior with machine learning techniques. Some other approaches focus on node-level deadlocks or data races. While these offline solutions are useful for diagnosing various runtime failures, they do not support generic, resource-friendly distributed diagnosis of complex failures occurring through sensor node interaction, in end applications as well as core protocols.

Tracing of message sends and receives is a cornerstone of distributed diagnostic tracing. To faithfully trace distributed program behavior, it is of utmost importance to be able to accurately pair message sends (cause) and receives (effects). When observing distributed failures in WSNs four specific constraints for a generic and efficient message tracing solution emerge:

Resource constraints. As stated, WSNs are highly resource-constrained, and thus mechanisms for tracing distributed interaction via message sends and receives should impose low overheads. In particular, traces on individual nodes should be well compressible to reduce storage and communication overheads, which dominate the tracing overhead.

Message losses. Pairing of message sends and receives cannot simply be inferred from sequences of such events, when individual messages can get lost. Yet, due to the inherent dynamic nature of WSNs, best-effort transmission protocols are commonly used directly.

Out-of-order reception. Similarly, basic communication protocols used directly by end applications and other protocols do not provide ordered message delivery, which adds to the difficulty of pairing up message sends and receives.

Local purging. When trace storage is full, the decision to rewrite the trace storage has to be a local decision for energy efficiency purposes. Since external flash is very limited (about 512 KB-1 MB), the traces fill the storage quickly. Purging traces locally at arbitrary points of the execution complicates pairing up message sends and receives.

The state-of-the-art fails in some requirements. This holds in particular for the golden standard originating from wireline networks and then adapted for WSNs of identifying messages with Lamport clocks paired with sender identifiers: besides generating false positives at replay (Lamport clocks being complete but not accurate) this solution does not inherently support losses and is not as lightweight as it may seem at first glance.

Herein is presented a novel message tracing scheme for WSNs that satisfies all the four requirements above. Our approach exploits restricted communication patterns occurring in WSNs and includes three key ideas: (1) use of per-channel sequence numbers, which enables postmortem analysis to recover original ordering despite message losses and out-of-order message arrivals, (2) address aliasing, where each node maintains a smaller id for other nodes it communicates more often with, and (3) optimization for the common case of in-order reliable delivery. We combine our message traces with the local control-flow trace of all events generated by the state-of-the-art to get the entire trace of the distributed system.

Herein are described:

a novel distributed message tracing technique that satisfies our four constraints.

the effectiveness of the distributed traces achieved by our message tracing technique in combination with control-flow path encoding for individual sensor nodes with the open-source TinyTracer framework via several real-world WSNs distributed protocol faults described in the literature.

the significant reduction in trace size and empirically demonstrate the ensuing energy savings (up to 95% and on average 59%) of our technique over the state-of-the-art, irrespective of its inconsistencies in tracing of communication (and thus misdiagnosis) in the presence of message losses and out-of-order message arrivals.

There are described herein various existing approaches in trace-based debugging, challenges specific to WSNs, and desirable attributes for tracing routines to possess to be useful for distributed faults diagnosis in WSNs.

Trace-based replay debugging is a promising approach for debugging distributed systems. A correct replay is one in which the causal ordering of messages observed in the original execution is maintained. Causal ordering of messages is defined as follows. A message send causally precedes its corresponding receive, and any subsequent sends by the same process. If a message $m_1$ received by a node before it sends another message $m_2$, then $m_1$ causally precedes message $m_2$. Causal ordering is transitive, i.e., if $m_1$ causally precedes $m_2$ and $m_2$ causally precedes $m_3$, then $m_1$ causally precedes $m_3$.

To obtain the causal ordering of the original execution, the message dependences have to be recorded in the trace. In trace-based replay solutions for wired distributed systems, the message dependences are captured using logical clocks. Originally proposed for enforcing ordering of events (including messages) in fundamental distributed systems problems such as ordered broadcast and mutual exclusion, logical clocks are used here to capture the ordering during the original execution and recreate it in the replay.

Lamport clocks use a single integer maintained by each node. While scalable, they are inaccurate meaning some concurrent events are classified as causally related. This inaccuracy can slow down replay of a network because concurrent events can be replayed in parallel threads, and yield false positives. To overcome inaccuracy, vector clocks can be used which precisely capture concurrent and causally related events. Vector clocks have been used to identify racing messages and by recording only those racing messages, trace sizes can be reduced considerably. Since vector clocks maintain n integers, where n is the number of nodes in the network they impose high overhead and do not scale well. Between these two extremes of Lamport clocks and vector clocks, there are other logical clocks such as plausible clocks or hierarchical clocks. However, most tracing-based replay solutions use Lamport clocks because of their ease of implementation and scalability.

Figure 2A:
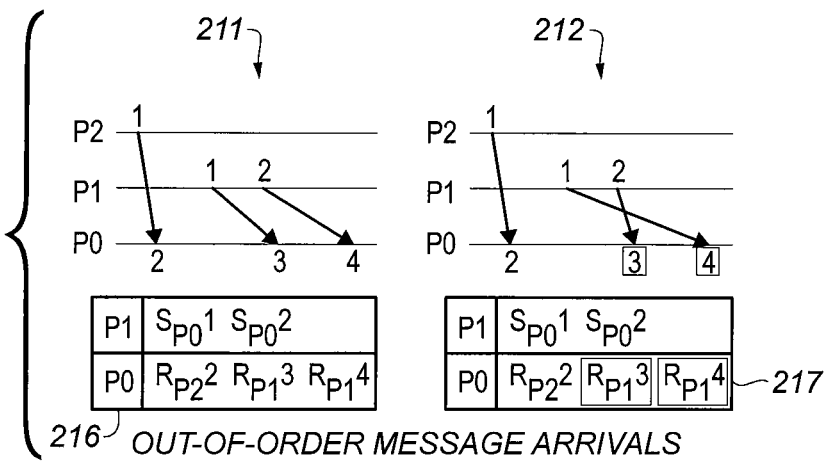
FIGS. 2A-2C show examples of prior-art tracing schemes.
Figure 2B:
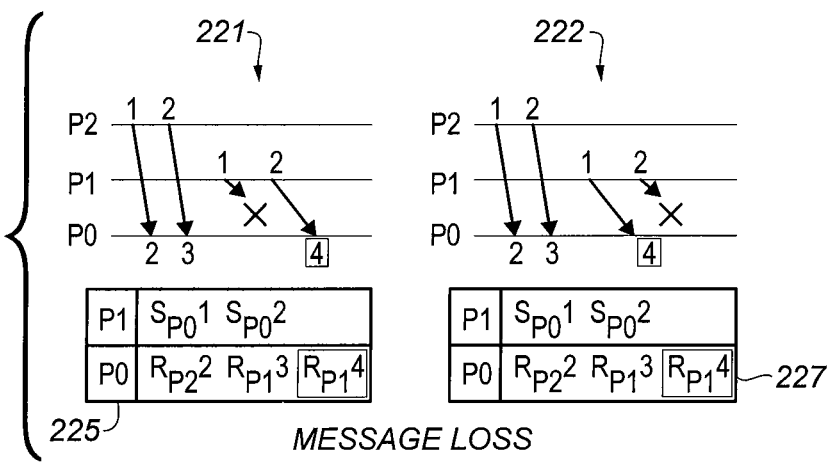
Figure 2C:
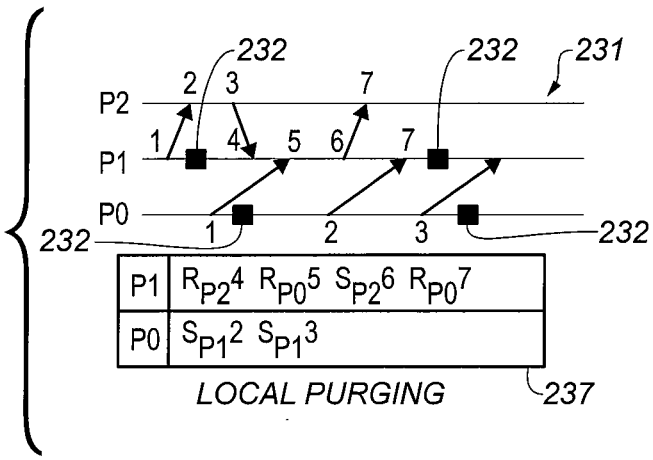

FIGS. 2A, 2B, and 2C are examples showing the shortcomings of Lamport-clock based message tracing when pairing message receive events with the corresponding send events in the presence of unreliable channels or arbitrary local purging of traces. The traces from processes P0 and P1 are shown below the space-time representation of processes.

FIG. 2A shows a simple example with a same trace being generated in both cases where messages arrive in order (plot 211 and table 216) and out of order (plot 212 and table 217). It is impossible to correctly identify out-of-order arrivals from the trace during post-mortem analysis, implying that message receive events cannot be paired with corresponding sends. Specifically, tables 216 and 217 contain the same information (see boxed entries in table 217).

FIG. 2B shows an example in which it is impossible to identify which message was lost from the trace during postmortem analysis. In plot 221 and table 225, the first message from P1 was lost. In plot 222 and table 227, the second message from P2 was lost. However, tables 225 and 227 contain the same information, indicating that the difference was not detected (see boxed entries in tables 225, 227).

FIG. 2C shows an example in which it is impossible to tell whether the receive event 7 in process P1 pairs with send event 2 or 3 in process P0 just by looking at the traces. The square black dots 232 in plot 231 represent the points in time where the local traces are purged. Table 237 shows the trace data; compare to table 339, FIG. 3C.

Existing trace-based replay solutions for wired distributed systems work under the assumptions of abundance of energy (connected to wall-socket), storage in the order of gigabytes, and network bandwidth in the order of at least kilobytes per second. More importantly, these distributed applications are assumed to run on top of a FIFO reliable communication layer such as TCP. These assumptions do not hold in WSNs and any WSN message tracing solution should cope with (1) stringent resource constraints, (2) out-of-order message arrivals, (3) message losses, and (4) local purging. Furthermore, the resource constraints in WSNs requires the traces recorded to be highly compressible, which means newly recorded information has less variability from previously recorded information. We show that the existing approaches cannot cope with unreliability and local purging as well as are not very compressible.

The existing approaches that record logical clocks alone cannot recreate the causal order correctly in the presence of unreliability. This is true even for approaches using vector clocks. Combining Lamport clocks with sender addresses as proposed by Shea can still lead to inconsistent causal ordering due to unreliable communication. We show this in the case for Lamport clocks with the help of counter-examples.

FIGS. 2A-2C show the counter-examples as a space-time diagram representation of processes and their message interaction. The horizontal lines in the space-time diagram represent the processes with time increasing from left to right and the arrows represent messages, with the direction of arrow from sender to receiver. The traces contain the event type (send/receive), process identifier, and the Lamport clock value. Such traces cannot correctly pair up message send events with their corresponding receive events when there are out-of-order message arrivals, message losses or arbitrary local purging of traces.

FIG. 2A illustrates that the traces cannot correctly pair up message send events with their corresponding receive events when the underlying channel can reorder messages. In this example, it is not possible to pair the receive events 3 and 4 in process P0 with the corresponding send events.

FIG. 2B illustrates that the traces cannot identify the message send event corresponding to a lost message. In this example, it is impossible to pair the receive event 4 in process P0 with the corresponding send event.

FIG. 2C illustrates that the traces cannot correctly pair up message send events with their corresponding receive events when the traces are purged locally to handle full trace buffers. The black square dots represent the points in time when the traces are locally purged. The traces shown for process P0 and process P1 are the snapshots of the respective trace buffers. In this example, either of the receive events 5 and 7 in process P1 pairs with send events 2 and 3 in process P0 and so it is impossible to pair receive event 7 in process P1 with the corresponding send event 2 in process P0.

In the cases discussed above, the problem is that Lamport clocks count events in the distributed system globally, which means the clock value depends on multiple nodes. Such global counting causes logical clocks to increase their values without regular intervals, which reduces the opportunities for compression.

CADeT can be combined with node-local approaches such as to diagnose distributed faults. We summarize one such state-of-the-art local tracing approach called Tiny-Tracer as we use it in our evaluation. TinyTracer encodes the interprocedural control-flow of concurrent events in a WSN before discussing fault case studies. First, let us consider the intraprocedural encoding. If there are n acyclic control-flow paths in a procedure, it can be encoded optimally with log n bits as an integer from 0 to n−1. In their seminal paper, Ball and Larus proposed an algorithm that uses minimal instrumentation of the procedure to generate the optimal encoding at runtime. TinyTracer extends that approach to generate interprocedural path encoding of all concurrent events in WSN applications written in nesC for TinyOS, a widely used WSN operating system. The technique records the event identifier at the beginning of the event handler and the encoding of the interprocedural path taken inside the event handler and an end symbol at the end of the event handler. The trace generated by the approach would include all the concurrent events along with the interprocedural path taken in the order the events occurred.

Herein is described ways to enhance local control-flow traces such that distributed faults in WSNs can be diagnosed efficiently.

We propose a novel efficient decentralized compression-aware message tracing technique that records message order correctly and satisfies the WSN specific requirements.

We exploit the following WSN application characteristics: Nodes most commonly communicate with only few other nodes, usually the neighbors or special nodes such as cluster heads or a base station. Nodes local control-flow trace can be used to infer the contents of the message such as type and local ordering. The common case is that messages are not lost and arrive in order, though aspects herein can handle losses and out-of-order arrivals.

Various aspects herein are designed with the common case in mind. This case is when there are no message losses or out-of-order message arrivals. For the common case, we record minimal information required to trace a message and ensure that information is compressible, which means the recorded information for a message has less variability from previously recorded information. This is achieved by maintaining some in-memory state which is periodically recorded into the trace and serves as local checkpoint. When a message loss or out-of-order message arrival occurs, we store additional information to infer it.

There are many advantages of our design. First, our design allows message sends and receives to be paired for both unicast and broadcast even in the presence of unreliability. Second, our design is compression-aware, i.e., it records information such that it can be easily compressed. Third, our design allows lightweight local checkpointing and the checkpoints store information about the number of messages sent/received with every node it communicates with. Fourth, our design is efficient because it uses only one byte sequence numbers as the sequence numbers are unique to each pair of nodes and take long time to wrap around.

Compression-aware distributed tracing uses two techniques, namely, address aliasing and per-partner sequence numbers. We refer to the nodes that communicate with a particular node as partners of that node. For each partner, a local alias, which can be encoded in fewer bits compared to the original address (unique network address), is assigned when a communication is initiated or received from that partner. This mapping (one-to-one) from original addresses to aliases is maintained in an address alias map, AAMap. For each local alias, we also maintain a pair (last sequence number sent, last sequence number received) in a partner communication map, PCMap.

Table 1 presents an exemplary tracing algorithm for transmission of messages. Table 2 presents the corresponding algorithm for receipt of messages. AAMap is a map from partner addresses to local aliases and PCMap a map from local aliases to respective communication histories. LOOKUPAAMAP returns the unicast alias of the message network address of the destination. If the destination address is not present, the destination address is added along with the next available local alias to the AAMap and that alias is returned. Similarly, LOOKUPAAMAPBCAST returns the broadcast alias for the network address, which is different from the unicast alias. LOOKUPPCMAP returns the communication history of the partner. If the partner alias is not present, it is added along with the pair (0,0) to the PCMap and the pair (0,0) is returned indicating no communication history in the map. The address of the node, the message's destination address and the message's source address are respectively shown as myAddr, msg.destAddr, and msg.sourceAddr.

TABLE 1

Tracing message sends

1:  UPON SEND (msg)
 2:  if msg.destAddr is not a broadcast address then
 3:      alias ← LOOKUPAAMAP (msg.destAddr)
 4:  else
 5:      alias ← LOOKUPAAMAPBCAST (myAddr)
 6:  end if
 7:  (lastSentSeq, lastRcvdSeq) ← LOOKUPPCMAP (alias)
 8:  nextSendSeq ← lastSentSeq + 1
 9:  APPENDTOMESSAGE (myAddr, nextSendSeq)
10:  RECORDTOTRACE ('S', alias)
11:  UPDATEPCMAP (alias, (nextSendSeq, lastRcvdSeq))

TABLE 2

Tracing message receipt

1:  UPON RECEIVE (msg)
 2:  if msg.sourceAddr is not a broadcast address then
 3:      alias ← LOOKUPAAMAP (msg.sourceAddr)
 4:  else
 5:      alias ← LOOKUPAAMAPBCAST (msg.sourceAddr)
 6:  end if
 7:  (lastSentSeq, lastRcvdSeq) ← LOOKUPPCMAP (alias)
 8:  expectSeq ← lastRcvdSeq + 1
 9:  if msg.seq = expectSeq then
10:      UPDATEPCMAP (alias, (lastSentSeq, expectSeq))
11:      RECORDTOTRACE ('R', alias)
12:  else if msg.seq > expectSeq then
13:      UPDATEPCMAP (alias, (lastSentSeq, msg.seq))
14:      RECORDTOTRACE ('R', alias, msg.seq)
15:  else
16:      RECORDTOTRACE ('R', alias, msg.seq)
17:  end if FIGS. 3A-3C show traces generated by CADeT for the same set of processes and messages as in FIGS. 2A-2C. The boxed entries in the traces (tables 317, 326, 328) shows that message loss and out-of-order message arrivals can be distinguished correctly and message sends and receives can be paired correctly. In FIG. 3C the local checkpoints are shown as black square dots 332 on the space-time diagram 331. The internal data structures are not shown.

FIG. 3A shows plot 311 with tables 316, 318 and plot 312 with tables 317, 319. FIG. 3B shows plot 321 with tables 326, 328 and plot 322 with tables 327, 329. FIG. 3C shows plot 331 with tables 337, 339.

When a node Q sends a message to a partner P the sender address Q and the next sequence number are appended to the message and the send event and the alias for P are recorded in the trace. Observe that the next sequence number is not recorded. We update the PCMap with the new sequence number. Suppose the partner is not present in AAMap, then an alias for that partner is added to AAMap and the new alias with pair (0,0) is added to PCMap.

When a node P receives a message from a partner Q the sequence number received in the message is checked against the expected sequence number (=last sequence number received+1) from the PCMap at P. If the sequence number in the message is the same as the expected sequence number, then the receive event and the alias of Q are recorded in the trace. The PCMap is updated with the expected sequence number indicating that the sequence number has been successfully received. This is the common case when there are no message losses or out-of-order message arrivals.

If the sequence number in the message is greater than expected (some message loss or out-of-order message arrival happened), then PCMap is updated with the sequence number of the message as the last sequence number received. If the sequence number in the message is less than expected (some old message is arriving late), the PCMap is not updated. In both the cases of unexpected arrivals, the receive event, the alias of Q, and the unexpected sequence number are recorded in the trace. Note that we record the unexpected sequence number information in the trace to correctly pair messages in the case of message loss or out-of-order message arrival.

In WSNs, broadcasts to neighbors are not uncommon— e.g., advertise detection of an intruder to your neighbors. It's necessary to handle broadcast to be able to pair sends and receives correctly. To handle broadcast, we treat each node to have two addresses, its own address and its own address with a broadcast marker. Thus, when a broadcast is sent or received, it is counted separately from the unicast. For example, when a node P sends a broadcast followed by a unicast to node Q and assuming no other communication happened in the network, node Q's AAMap map will have two entries, one for node P (unicast receive), and another for node P* (broadcast receive) and its PCMap will contain two (0,1) entries corresponding to the two messages received from node P. Similarly, node P will have two entries in AAMap corresponding to node Q (unicast send) and node P* (broadcast send) and its PCMap will contain two (1, 0) entries corresponding to the two sends. Both the unicast send and the broadcast send of node P can be correctly paired with their corresponding receives at node Q as the send and receive events are counted separately.

FIGS. 3A-3C show how CADeT handles out-of-order message arrivals, message losses and local purging for the scenarios shown in FIGS. 2A-2C. that the difference between plot 311 and plot 312 can be determined from the trace. Likewise, the following pairs of tables differ: 318, 319; 326, 327; 328, 329. In table 339 (FIG. 3C), unlike in FIG. 2C, the send from P0, message 2, to P1, is clearly indicated ($S_{P1}2 \rightarrow R_{P0}2$).

The algorithm tracks the order of message receptions. Because sender-receiver pairs are handled independently of each other by including sender identifiers, it is sufficient to consider one sender-receiver pair. Assume a sequence of messages received with respective sequence numbers [$i_1$, $i_2$, $i_3$, $i_4$, . . . ]. Rather than logging the numbers, an equivalent way is to log the first, then the differences $i_1$, [$i_2$−$i_1$, $i_3$−$i_2$, $i_4$−$i_3$, . . . ]. The original order can be trivially reconstructed. The numbers in the original sequence need not be ordered which supports out-of-order message reception and message losses. In our case, the difference between adjacent numbers in the sequence is commonly 1, which can be exploited by logging a simple predefined tag rather than the difference value. Otherwise we log the number itself which is equivalent to logging the difference as explained above. Since senders use monotonically increasing per-receiver counters the differences between subsequent message sends are invariably 1 and sequence numbers are unique, allowing for correct pairing. Since broadcast uses separate counters, the same reasoning applies.

Figure 20:
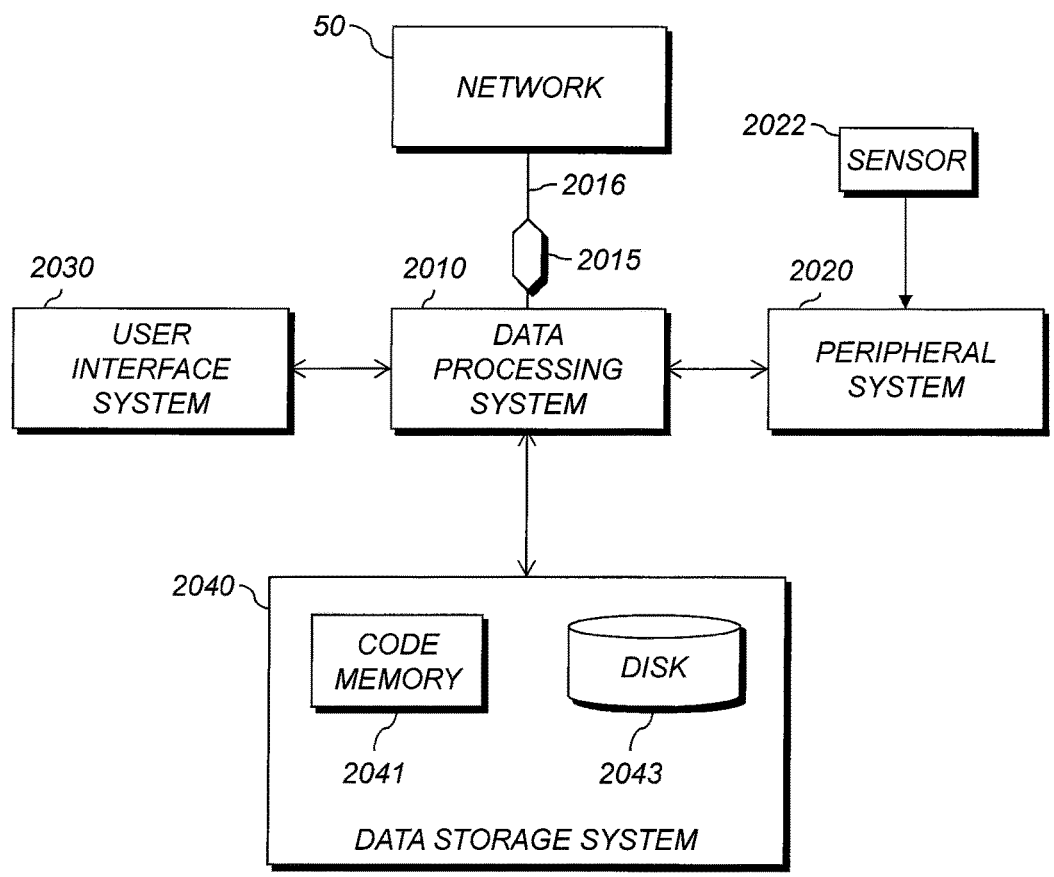
FIG. 20 is a high-level diagram showing components of a data-processing system according to various aspects.

Specifically, in various aspects, a method of transmitting data to a network device includes the below-described steps using a processor. The steps can be performed in any order except when otherwise specified, or when data from an earlier step is used in a later step. The method can include automatically performing below-described steps using a processor 2086 (FIG. 20). For clarity of explanation, reference is herein made to various equations, processes, and components described herein that can carry out or participate in the steps of the exemplary method. It should be noted, however, that other equations, processes, and components can be used; that is, exemplary method(s) discussed below are not limited to being carried out by the identified components.

A packet-identification value is first stored in a first storage element. This can be performed as noted above with reference to lastSentSeq and nextSendSeq. As used herein, "storage elements" can be, e.g., individual addresses in a given RAM or NVRAM, or can be separate memories, SRAMs, caches, CPU registers, or other electronically-accessible data storage cells or units. Other examples of storage elements are discussed below with reference to data storage system 2040, FIG. 20. A packet of data and the stored packet-identification value are then transmitted to the network device, e.g., a peer in a communications network. The network device has an identifier, e.g., alias. The address of the sender can be provided to the peer, e.g., in the data packet or a header thereof.

In a tracing step, the identifier is stored in a second storage element in association with an indication that the packet was sent. This can correspond to the RECORDTOTRACE function noted above. The indication can have any format, e.g., a bit field or a character such as ASCII 'S' (0x53).

The stored packet-identification value is then recorded in a third storage element in association with the identifier. This can be performed as discussed above with reference to UPDATEPCMAP.

After the recording and tracing steps, the stored packet-identification value can be increased. This can be done as noted in Table 1, line 8 (increasing nextSendSeq).

The transmitting, tracing, recording, and increasing steps can then be repeated one or more times for successive packets.

In various aspects, the method further includes mapping a network address of the network device to the identifier (alias). The identifier in these aspects occupies fewer bits than the network address. Examples of aliases are shown in FIGS. 3A-3C, in which small integers 0,1, 2, . . . are used as aliases.

In various aspects, the network device has a network address that is either a broadcast address (i.e., a broadcast address the device responds to) or a unicast address. In these aspects, the method further includes determining the identifier of the network device using the network address, so that an identifier corresponding to the broadcast address is different from an identifier corresponding to the unicast address. This can be as discussed above with reference to Table 1, lines 2-6.

In various aspects, the increasing step includes adding unity (1) to the stored packet-identification value. This is noted above in Table 1, line 8.

In various aspects, the increasing step includes adding to the stored packet-identification value a variable stride. That is, the amount added to the stored value can be different each time, e.g., alternating between two values. This was noted above with reference to FIG. 1, discussing variable-stride counts.

In various aspects, before the transmitting step, data compression is performed as described below with reference to the "Prius" family of algorithms. In these aspects, a compression table is stored in a memory. The compression table corresponds to results of processing a set of training trace data using a table-driven compression algorithm. A payload of the packet of data is then determined by compressing the data in the second storage element using the stored compression table according to the table-driven compression algorithm, wherein the stored compression table is accessed in a read-only manner.

With regards to packet reception, a method of receiving data from a network device according to various aspects includes the following steps. The network device has an identifier, e.g., alias. As noted above, the order of presentation is not limiting, the method can include automatically performing the following steps using a processor, and specifically-identified components or algorithms are exemplary.

An expected identification value (e.g., expectSeq) is stored in a first storage element, and the expected identification value is stored in association with the identifier. This can be done, e.g., in the PCMAP noted above in Table 2. As discussed, expectSeq can be initialized to 0 (e.g., the pair (0,0) can be added to the PCMAP).

A packet of data and a packet-identification value are then received from the network device. This can include retrieving the sourceAddr from the message and looking up the identifier in the AAMAP, e.g., as shown in Table 2, lines 2-6.

There are then stored in a second storage element the identifier in association with an indication that the packet was received and, if the packet-identification value does not match the stored expected identification value associated with the identifier, in association with the received packet-identification value. This can be as shown in Table 2, lines 11, 14, and 16 (RECORDTOTRACE). Subsequently, a comparing step is performed. This step, discussed below, can include functions such as UPDATEPCMAP and others in Table 2, lines 9-17.

If the received packet-identification value matches the expected identification value, there is recorded in a third storage element the stored packet-identification value in association with the identifier (Table 2, line 10).

If the received packet-identification value exceeds the expected identification value (with wraparound taken into account), there is recorded in the third storage element the stored packet-identification value in association with the identifier and in association with the received packet-identification value (Table 2, line 13).

Subsequently, the stored expected identification value is increased (Table 2, line 8). This can include, e.g., adding to the stored packet-identification value unity or a variable stride, as discussed above. The receiving, storing, comparing, and increasing steps are then repeated one or more times for successive packets. Examples of the resulting PCMAP and AAMAP data are shown in FIGS. 3A-3C.

In various aspects, a network address of the network device is mapped to the identifier, e.g., as in Table 2 lines 3 and 5. The identifier occupies fewer bits than the network address in these aspects.

In various aspects, is either a broadcast address (i.e., a broadcast address the device responds to) or a unicast address. The method further includes determining the identifier of the network device using the network address (e.g., via the AAMAP and AAMAPBCAST), so that an identifier corresponding to the broadcast address is different from an identifier corresponding to the unicast address.

In various aspects, trace data produced during packet reception are compressed using the Prius algorithms discussed below. In these aspects, the method further includes storing a compression table in a memory. The compression table corresponds to results of processing a set of training trace data using a table-driven compression algorithm. The data in the second storage element are compressed using the stored compression table according to the table-driven compression algorithm, during which the stored compression table is accessed in a read-only manner. Examples of data in the second storage element are given in tables 318, 319, 328, 329, and 339 (FIGS. 3A-3C). The compressed trace data are then transmitted via a network interface operatively connected to the processor.

In various aspects, a network node or other network device (e.g., a node 100, FIG. 1) is configured to implement the algorithms described in Table 1, Table 2, or both, or other algorithms using per-link, per-direction sequence numbers as described herein. The network device has a network address and is configured to participate in a network including one or more remote network device(s) having respective network addresses. As used herein, "remote" network devices are those that are not localhost, regardless of the physical distance or number of hops between the network device and any given remote network device. Exemplary network devices include wireless devices and wired devices such as routers, hubs, switches, nodes, or anything else that is configured to communicate with another network device via a network.

The network device includes a network interface configured to selectively communicate data packet(s) with the remote network device(s); first, second, and third storage elements (of any size); and a processor (e.g., processor 2086, FIG. 20). The network interface can include a wired- or wireless-communications transceiver.

The processor is configured to trace packets sent or received. In at least one example, the processor is configured to record in the first storage element a respective identifier for each of the remote network device(s) with which the network interface communicates at least one data packet. Each respective identifier occupies fewer bits than the network address of the respective one of the remote network device(s). This can include updating the AAMAP or an equivalent table.

The processor is further configured to record in the second storage element respective, independent running transmit and receive sequence numbers for each of the remote network device(s) with which the network interface communicates a data packet in association with the respective identifier(s) thereof. The sequence numbers are stored separately for TX or RX, and are not required to update on every packet, as described above. This can include updating the PCMAP or equivalent. For example, in some aspects, the processor is configured to increase the running transmit sequence number each time the network interface transmits a data packet to one of the remote network device(s). This can be as shown in Table 2, line 8. In various aspects, the processor is further configured to update the receive sequence number corresponding to an identifier when the received data packet is received from the respective remote network device and has the packet-identification value is at least the receive sequence number at the time of receipt.

The processor is also configured to record in the third storage element record(s) of transmitted data packet(s) and records(s) of received data packet(s). These records can be trace-buffer records. Each of the record(s) is stored in association with the identifier of the corresponding remote network device, and each record of a received data packet including a packet-identification value of the received data packet if the packet-identification value does not match the corresponding running receive sequence number at the time of receipt.

In various aspects, the network device includes a sensor (e.g., sensor 2022, FIG. 20) configured to provide sensor data. In these aspects, the processor is further adapted to transmit representation(s) of the provided sensor data as part of the transmitted data packet(s). The processor can also transmit packets not including sensor data. The sensor can be, e.g., an environment-monitoring sensor, a structural-monitoring sensor, a border-surveillance sensor, and an industrial-machinery-monitoring sensor.

In various aspects, a system includes a plurality of network devices having respective network addresses. Each of the network devices comprises structures discussed below. There can be other devices or nodes on the network not including these features.

Each of the network devices includes a network interface configured to selectively communicate data packet(s) with other(s) of the network devices, first, second, and third storage elements, and a processor, e.g., processor 2086, FIG. 20.

The processor is adapted to record in the first storage element a respective identifier for each of the network devices with which the network interface communicates at least one data packet, wherein each respective identifier occupies fewer bits than the network address of the respective one of the network devices. The processor is further adapted to maintain in the second storage element respective, independent running transmit and receive sequence numbers for each of the network devices with which the network interface communicates a data packet in association with the respective identifiers thereof. The processor is still further adapted to maintain in the third storage element record(s) of transmitted data packet(s) and records(s) of received data packet(s), each of the record(s) stored in association with the identifier of the corresponding remote network device, and each record of a received data packet including a packet-identification value of the received data packet if the packet-identification value does not match the corresponding running receive sequence number at the time of receipt. These functions can be performed as described above with reference, e.g., to Table 1 and Table 2.

In some aspects, each of the network interfaces includes a respective wireless-communications transceiver. Each of the network devices includes a respective sensor, e.g., sensor 2022, FIG. 20, configured to provide sensor data. Each of the processors is further adapted to transmit representation(s) of the provided sensor data from the respective sensor as part of the transmitted data packet(s).

With the help of real-world bug case studies, we show that the distributed control-flow traces generated by CADeT together with TinyTracer aid in diagnosing complex faults in distributed protocols proposed for WSNs. First, we present LEACH, a WSN clustering protocol, followed by diagnosis of two faults diagnosed in its implementation. Next, we present diagnosis of faults in WSNs designed as pursuer-evader networks. Finally, we present diagnosis of two practical issues in directed diffusion, a scalable and robust communication paradigm for data collection in WSNs. In all the case studies, we assume the presence of CADeT's trace of messages as well as trace of message send and receive events local control-flow.

LEACH

LEACH is a TDMA-based dynamic clustering protocol. The protocol runs in rounds. A round includes a set of TDMA slots. At the beginning of each round, nodes arrange themselves in clusters and one node in the cluster acts as a cluster head for a round. For the rest of the round, the nodes communicate with the base station through their cluster head. The cluster formation protocol works as follows. At the beginning of the round, each node elects itself as a cluster head with some probability. If a node is a cluster head, it sends an advertisement message out in the next slot. The nodes that are not cluster heads on receiving the advertisement messages from multiple nodes, choose the node closest to them based on the received signal strength as their cluster head and send a join message to that chosen node in the next slot. The cluster head, on receiving the join message, sends a TDMA schedule message which contains slot allocation information for the rest of the round, to the nodes within its cluster. The cluster formation is complete and the nodes use their TDMA slots to send messages to the base station via the cluster head.

Fault Description

When we increased the number of nodes in our simulation to 100, we found that data rate received at the base station reduced significantly. The nodes entered N0-TDMA-STATE and didn't participate in sending data to the clusterhead. The reason was that many nodes were trying to join a cluster in the same time slot. Due to the small size of the time slot, Join messages were colliding. Consequently, only fewer nodes successfully joined clusters. The nodes that did not join the cluster in a round remained in N0-TDMA-STATE resulting in lower throughput. To repair the fault, we increased the number of time slots for TDMA and introduced a random exponential backoff mechanisms.

Diagnosis with CADeT

When the throughput dropped at the base station, the traces from several nodes were examined. The abnormal control-flow in the trace revealed that some nodes did not have a slot assignment. We then confirmed that TDMA schedule broadcast was indeed received. We analyzed the trace to find the cluster head from the Join message sent to the cluster head in that round. When trying to pair the Join messages, we noticed the cluster head did not receive the Join message and therefore, did not allocate a slot for that node in the TDMA schedule. Since the Join message send was recorded but not receipt thereof, the link between cluster node and the cluster head can be inferred to have failed either due to congestion or channel corruption. When we made the channels perfect in our simulations, we still observed the same result leading us to identify Join message collision as only possible explanation for link failure.

Data Race in LEACH

Fault Description

When we increased the number of nodes in the simulation to 100, we noticed significant reduction in throughput. Similar to the above case study, the nodes entered N0-TDMA-STATE and didn't participate in sending data to the clusterhead. However, the root cause was different. The problem was due to a data race between two message sends that happens only at high load.

After sending the TDMA schedule message, the cluster head moves into the next state and sends a debug message to the base-station indicating it is the cluster head and the nodes in its cluster. When the load is high, the sending of TDMA schedule message may be delayed because of channel contention. This in turn affects the sending of debug message as the radio is busy. In WSNs, message buffers are usually shared among multiple sends. It's not uncommon to use one global shared buffer for sending a message as only one message can be sent at a time. When attempting to send the debug message, before checking the radio was busy, the message type of the global shared buffer was modified unintentionally and therefore, the TDMA schedule message was modified into a debug message. Due to this implementation fault, the global send buffer was corrupted which resulted in wrong message being delivered. The nodes in the cluster dropped this message after seeing the type, which is intended only for the base station. This error manifested only when the number of nodes was increased because the increase in load caused the TDMA schedule message to be retried several times and the original time slot was not enough for the message transmission. We fixed this error by removing the fault as well increasing the time slot size to send TDMA message.

Diagnosis with CADeT

We examined several node traces after noticing poor throughput. We found that the cluster nodes were in the same state N0-TDMA-STATE as the above case study. Since we fixed the join message congestion, we examined the traces closely and noticed that some unexpected message was received after sending the Join message. When we paired that message receive with the sender, we realized that message was a TDMA schedule message. From the receiver trace control-flow, it was clear that the message was of unexpected type. However, the message was not garbled as it passed the CRC check at the receiver. This indicated that the problem was at the sender. We examined the senders control-flow closely and the trace indicated that there was a state transition timer event fired between the TDMA schedule message send and the corresponding sendDone event in the cluster head. From the sender's control-flow, we noticed that debug message send interfered with the TDMA send and the implementation fault that corrupted the message buffer was discovered.

Intrusion Detection Failure in Pursuer-Evader Networks

WSNs used for military or border surveillance are modeled as pursuer-evader games, where the WSN is the pursuer and the intruder is the evader. The main goal of these WSNs is to alert the base station when an intruder is detected by sensors. To avoid congestion of alerts sent to the base station, one node acts as a leader and alerts the base station of the intruder. The following simple decentralized leader election protocol is employed. The nodes broadcast the signal strength detected to their neighbors and the node with the strongest signal elects itself as the leader. In these WSNs, failing to detect an intruder is a serious problem and hence needs to be diagnosed.

Fault Description

The failure to detect an intrusion can be caused by link asymmetry, time synchronization error, or link failure. Let node A be the node with the strongest signal during an intrusion. If there is link asymmetry, node A would not get neighbors broadcast while they get node A's broadcast. The neighbors would assume node A will elect itself as leader. However, node A would falsely assume that the signal detected locally was spurious because it did not hear from other neighbors. Therefore, node A will not elect itself as the leader and the intrusion will not be detected. A similar situation may arise if there is a time synchronization error. Node A may check for neighbors broadcast before they are supposed to be received because of time synchronization error. Node A would falsely assume spurious local detection and not elect itself as a leader. If the link between node A and the base station fails, the intrusion detection failure occurs. In addition, intrusion detection failure can occur due to implementation fault in the code. It is important to detect, diagnose and repair such failures. Missing an intrusion can be determined by the base station if the intruder gains illegal access or some other part of the network catches the intruder.

Diagnosis with CADeT

When a failure report is received at the base station, it pulls the recent traces from the neighborhood. Note that the traces may contain messages exchanged before and after the intrusion because these WSNs are constantly running Since CADeT traces allow the ability to pair message sends and receives despite losses, it is possible to identify the time window in which the intrusion occurred (when there was broadcast among neighbors). Note that even when there are multiple intrusions, each intrusion occurrence can be identified due to increasing sequence numbers assigned to the message exchange generated by the intrusion. When the time window of the intrusion is identified from the traces, the detection failure can be narrowed down. If the traces show that an alert was sent by a node but that alert was not received at the base station, then the reason is the failure of link between the elected leader and the base station. If the traces show that a node, say node A has not recorded local broadcasts receipts but other nodes traces reveal the local broadcast sends and receipts, it is likely this node suffers from link asymmetry. If the control flow of other nodes show that those nodes did not expect to become the leader, then it is clear that this node was supposed to be the leader but due to link asymmetry it did not become a leader. If the node A's trace does have the receipt of the broadcast messages but the control-flow shows that node A assumed that the local detection of the intruder was a spurious signal before receiving the broadcast messages, it is likely node A was the supposed-to-be leader that was unsynchronized with the other nodes.

Serial Message Loss in Directed Diffusion

Directed diffusion is a communication technique that permits nodes (sink nodes) to express interest in data from other nodes in the network and these interest messages are propagated throughout the network through controlled flooding. The nodes matching the interest act as source nodes and send data back to the sink nodes using the paths taken by interest but in the opposite direction. An interest can be satisfied by a single data message or a stream of data messages from the source nodes. To achieve directed diffusion, nodes maintain an interest cache and a data cache. When an interest message is received, a node adds an entry to its interest cache if it is not already there, forwards the interest message to its neighbors other than the interest message sender, and creates a gradient (parent) towards the neighbor that sent the interest message. When a data message is received, a node checks for a matching interest in the interest cache. If a matching interest is present and the data message is not in the data cache, the data message is added to the data cache and is forwarded to all parents that have expressed interest in that data. Once the data flow for an interest is stabilized, the interest message will be renewed only through most reliable neighbor, and thereby, reducing duplicate traffic eventually.

Fault Description

There are two practical issues, namely, timestamp overflow and node reboots that are not handled well in directed diffusion design and both issues manifest as a continuous loss of messages at a different node (parent node) as discussed in Khan et al. Let node A be a source or forwarding node that satisfies an interest from the parent node B. In the case of timestamp overflow, parent node B drops the packet because of older timestamp. However in the case of node A reboot, node A drops the packet to be sent/forwarded to parent node B because its interest cache is wiped out after reboot. In both cases node, the manifestation is the same, which is B observes lower message rate and continuous message loss.

Diagnosis with CADeT

When node B reports loss of messages from node A, trace from these nodes are pulled to the base station. The last message sent from node A to node B is compared with the last message received at node B from node A. If they two match, it implies node A has not been sending more messages and perhaps has some problems. A mismatch implies the messages are either dropped at node B or link failure. In the former case, node A's control-flow trace is examined, which would reveal a reboot as the initialization functions called after the reboot would appear in the control-flow trace. In the latter case, node B's control-flow trace is examined. If the timestamp overflow happened, the control-flow trace would show that the code took a different path at the condition checking timestamp of the messages. If none of the two cases happened, the message loss is the most likely due to failure of link between nodes A and B.

Below is a comparison of various aspects herein (inventive) to the adapted state-of-the-art, Liblog (comparative), showing that these aspects reduce the trace size. For tractability and fairness we made several simplifying assumptions. First, traces are uncompressed. Second, each node communicates with a small subset of nodes called its partners. Among its partners, each node communicates with some of them regularly and some of them irregularly. Third, each node sends messages at the same rate to its partners. The notation used in the analysis is shown in Table 3.

TABLE 3

Notation used in the analysis

| | |
|---|---|
| n | number of nodes in a WSN |
| $n_P$ | number of partners that a node communicates with in a checkpoint interval |
| $n_R$, $n_O$ | number of partners that a node communicates regularly and occasionally respectively |
| $t_C$ | checkpoint interval |
| $r_S$ | rate of messages sent from a node to a partner |
| $p_O$ | percentage of occasional partners that a node communicates with in a checkpoint interval |
| $p_I$ | probability that a message arrives in order |
| $p_L$ | probability of a message loss |
| $b_I$ | number of bytes required to record a message send or an in-order message receive |
| $b_S$ | number of bytes required to record a sequence numbers by CADeT |
| $b_A$, $b_P$ | number of bytes required to record an AAMap entry and a PCMap entry in the trace respectively |
| $b_F$ | number of bytes required to record a sequence number by Liblog |
| $\gamma_N$ | size of the trace generated by CADeT due to messages sent to and received from all its partners in a checkpoint interval |
| $\gamma_S$, $\gamma_R$ | the size of the trace generated by CADeT due to messages sent to a partner or received from a partner respectively in a checkpoint interval |
| $\gamma_C$ | size of the trace generated by CADeT due to recording a checkpoint in the trace |
| $\delta_N$ | size of the trace generated by Liblog due to messages sent to and received from all its partners in a checkpoint interval |
| $\delta_S$, $\delta_R$ | size of the trace generated by Liblog due to messages sent to a partner or received from a partner respectively in a checkpoint interval |

The size of the trace generated at a node by CADeT ($\gamma_N$) depends on the checkpoint stored and the trace entries generated by messages sent and received by that node.

First, we calculate the size of the trace generated at a node in a checkpoint interval due to messages sent by a node ($\gamma_S$). The number of messages sent in a checkpoint interval, $\alpha$, is the product of average message rate from a node to a partner ($r_S$) and the total length of the checkpoint interval ($t_C$) and is given in Eq. 1.

$$\alpha = r_S t_C \quad (1)$$

The number of bits used to represent each message in the trace ($b_I$) is the sum of number of bits used to record that a message has been sent and the number of bits to record the destination alias. Since there are $\alpha$ messages sent in a checkpoint interval and each message generates $b_I$ bits of trace, the size of the trace generated at a node in a checkpoint interval due to messages sent by a node ($\gamma_S$) is their product and is given in Eq. 2.

$$\gamma_S = \alpha b_I \quad (2)$$

Next, we calculate the size of the trace generated at a node in a checkpoint interval due to messages received from another node, $\gamma_R$, as follows. Out of the messages sent to a node in a checkpoint interval, $\alpha$, only the fraction $(1-p_L)$ of them are received and lead to a trace entry, where $p_L$ is the probability of a message being lost. In CADeT, the size of the trace entry of a received message depends on whether a message was received in the order expected or not. If a message arrives when it was expected, then the receive event 'R' and the sender alias are recorded in the trace and this requires $b_I$ bytes, similar to recording a message send. However, if a message arrives earlier or later than expected, then CADeT stores the sequence number of the message into the trace in addition to the $b_I$ bytes recorded in the trace. If the probability of a message arriving when expected is $p_I$, $\gamma_R$ is given in Eq. 3.

$$\gamma_R = (1 - p_L)((\alpha b_I p_I) + (\alpha(b_I + b_S)(1 - p_I))) \quad (3)$$

$$= (1 - p_L)(\gamma_S + \alpha b_S(1 - p_I)) \quad (4)$$

In addition to tracing message sends and receives, CADeT dumps the internal tables (AAMap and PCMap) to the trace once every checkpoint interval. This is referred to as the checkpoint. Since the table contains one entry per partner, we need to estimate the number of partners a node communicates with in a checkpoint interval.

Each node communicates with its $n_R$ nodes regularly called its regular partners and $n_O$ nodes occasionally, called its occasional partners, over its lifetime. We observe that the number of partners a node communicates with over its lifetime, given by $n_R + n_O$, is much less than the total number of nodes in the network (n).

In a checkpoint interval, we assume that a node communicates with all its regular partners ($n_R$) and some of its occasional partners ($n_O p_O$), where $p_O$ is the percentage of occasional partners a node communicates with in a checkpoint interval. Now, the number of partners a node communicated with in a checkpoint interval ($n_P$) is given by Eq. 5.

$$n_P = n_R + n_O p_O \quad (5)$$

The size of that checkpoint, $\gamma_C$, is the product of the size of the internal table entries, $b_A$ and the number of partners this node communicated within that interval.

$$\gamma_C = (b_A + b_P) n_P \quad (6)$$

Since each node communicates with $n_P$ partners in a checkpoint interval, the trace size due to messages sent and received by a node is $(\gamma_S + \gamma_R) n_P$. Thus, $\gamma_N$ is given by Eq. 7.

$$\gamma_N = \gamma_C + (\gamma_S + \gamma_R) n_P \quad (7)$$

$$= n_P((b_A + b_P) + \gamma_S(2 - p_L) + \alpha b_S(1 - p_I)(1 - p_L)) \quad (8)$$

A prior-art way to capture message interactions in a distributed systems for replay is to record the Lamport clock along with local non-determinism, including capturing entire messages. Since recording a full message is prohibitively expensive, we adapt Liblog for WSNs as follows: record the sender address along with the Lamport clock for every message. This was also suggested by Shea. Henceforth, Liblog refers to this adapted version of Liblog. Although it may lead to inconsistent replay when message losses or out-of-order message arrivals can happen as described we use Liblog because it is the known state-of-the-art.

We calculate the size of the trace generated by Liblog in a checkpoint interval, $\delta_N$, similar to CADeT. Since Liblog records Lamport clocks in the trace entry, the periodic checkpoints taken by CADeT are not required as the clock value is cumulative. However, the number of bits to record the Lamport's clock, $b_F$ is larger as Lamport's clock increases with each message sent from all the nodes. Therefore, the size of the trace generated by Liblog depends on the messages sent and received. The trace size due to messages sent, $\delta_S$ is given by Eq. 9.

$$\delta_S = \alpha b_F \quad (9)$$

The messages received generate the same size trace entry irrespective of whether the message was received in order or not. The size of the trace generated at a node due to messages received by it is given by Eq. 10.

$$\delta_R = (1-p_L)\alpha b_F \quad (10)$$

The size of the trace generated in a checkpoint at a node, $\delta_N$ is shown in Eq. 11, where $n_p$ is the number of partners a node communicates with in a checkpoint interval and is shown in Eq. 5.

$$\delta_N = (\delta_S + \delta_R)n_P = n_P \alpha b_F(2-p_L) \quad (11)$$

Next we compare the trace sizes generated at a single node by CADeT and Liblog to quantify the advantage of CADeT. A difference between these two approaches stems from the number of bits used to store a trace entry in the common case, namely, $b_I$ for CADeT and $b_F$ for Liblog as we show below.

The ratio of $\gamma_N$ and $\delta_N$ is shown in Eq. 12.

$$\frac{\gamma_N}{\delta_N} = \frac{b_I}{b_F} + \left(\frac{b_A + b_P}{b_F}\right)T_1 + \frac{b_S}{b_F}T_2 \quad (12)$$

$$T_1 = \frac{1}{\alpha(2-p_L)},$$

$$T_2 = \frac{(1-p_I)(1-p_L)}{2-p_L}$$

Figure 4:
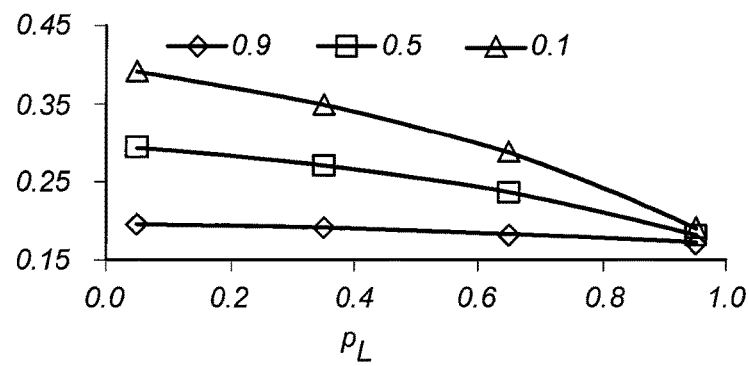
FIG. 4 is an example of effects of probability of loss and out-of-order message arrivals.

FIG. 4 shows effects of probability of loss and out-of-order message arrivals on $\gamma_N/\delta_N$. The x-axis is $p_L$ and each series in the graph correspond to different values of $p_I$ (0.9 for diamond markers, 0.5 for square markers, and 0.1 for triangular markers).

The smaller the ratio, the better it is for CADeT. We observe that the ratio is heavily dependent on $$\frac{b_I}{b_F}$$

because terms $T_1$ and $T_2$ are usually small. Since the number of messages per checkpoint interval a is large, $T_1$ is usually small. To see the effect of $p_L$ and $p_I$, we varied $p_L$ and plotted the ratio for different values of $p_I$, which is shown in FIG. 4. We used the following values from our empirical evaluation for other variables, namely $b_I=1$, $b_F=6$, $b_s=3$, $b_a=2$, $b_p=2$ and $\alpha=240$. As mentioned above, irrespective of the message losses and out-of-order message arrivals, the size of CADeT traces is very small (15% to 40%) compared to the size of Liblog traces. First consider the scenario of low message losses ($p_L \le 0.1$). When the messages arrive in order ($p_I \ge 0.9$), CADeT generates smaller size trace because of its efficient representation of common case. CADeT trace size is only about 20% of Liblog trace size. When the messages arrive out of order ($p_I \le 0.1$), CADeT trace size is about 40% of Liblog trace size. The competitive advantage of CADeT decreased in this case because out-of-order message arrivals require recording additional information such as recording full sequence numbers per out-of-order message arrival. Next, consider the scenario of high message losses ($p_L \ge 0.9$). Irrespective of the order of message arrivals, CADeT trace size is only 15% to 20% of Liblog trace size, which is somewhat counterintuitive. The reason for this is that the lost messages do not generate trace entries at the receiver but do have trace entries at the sender. Since the messages are sent in order, CADeT compresses trace entries corresponding to message sends very well as opposed to Liblog. The few messages that do get delivered at the receiver cause only small increase in trace size for CADeT.

In order to empirically demonstrate our claims, we implemented our technique CADeT as well as Liblog in TinyOS, a widely used WSN operating system. Results show that CADeT saves considerable energy at a moderate increase in program memory and data memory. We first present the evaluation methodology, followed by energy overhead savings and finally memory overhead.

Figure 5A:
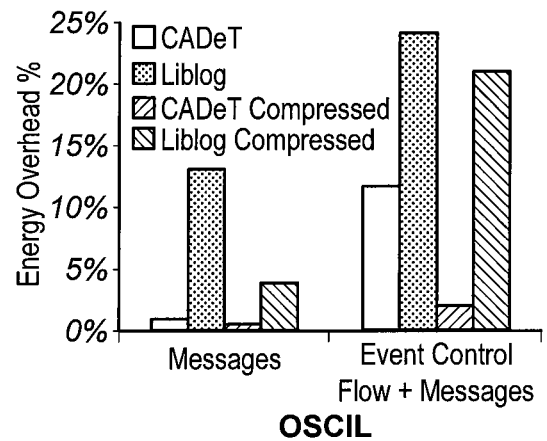
FIGS. 5A-5C show energy overhead due to CADeT (inventive) and Liblog (comparative)
Figure 5B:
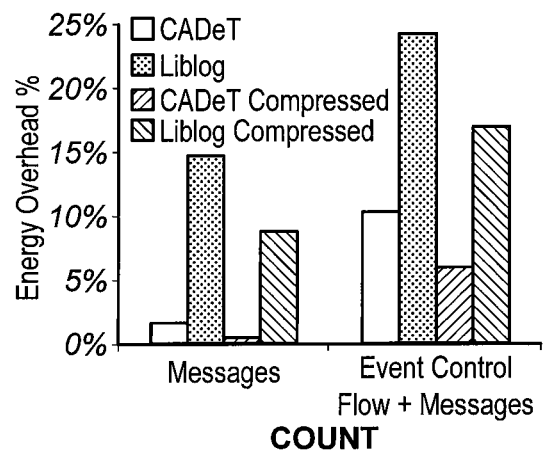
Figure 5C:
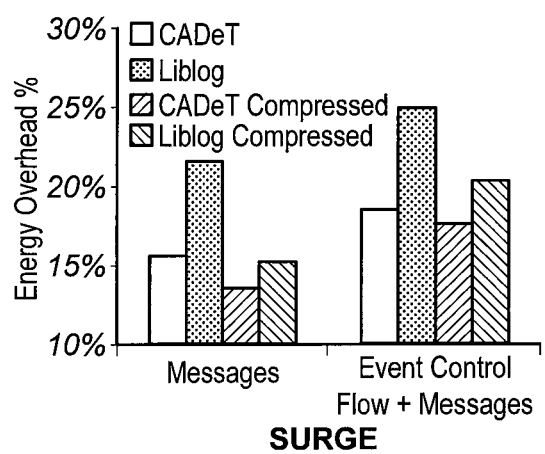

FIGS. 5A-5C show energy overhead due to CADeT and Liblog as a percentage of energy consumption without tracing. Each x-axis shows two configurations of tracing, one, when just the messages are traced and the other, when control-flow of the send and receive events along with messages are traced.

We used the following three metrics to evaluate our approach: (1) energy overhead, (2) program memory, and (3) data memory. Energy overhead corresponds to the additional energy required for tracing and is represented as a percentage of energy consumed by an application without tracing. Lower overhead is better. Observe that the savings in energy overhead are mainly due to trace size reductions and therefore, trace size reduction is implicit in energy overhead savings obtained. Memory is a precious resource for WSNs and both program memory and data memory are very limited. Since saving traces to flash occurs continuously while traces are collected only upon error detection/suspicion, we omit the latter overhead. Furthermore, there are techniques to reduce the trace collection overhead.

For our benchmarks, we used three well-known representative WSN applications which are packaged with TinyOS. First, Oscilloscope is a data collection application with high sensing rate (8 times a second). The sensor samples are stored in a buffer and the buffer is sent to the base station when full. Second, Surge is another data collection application with medium sensing rate (1 in two seconds). However, Surge is a more complex application as it supports sophisticated routing and a query interface to respond to base station queries. Finally, CntToRfmAndLeds is a counter application that receives and broadcasts counter values. We use oscil, surge and count respectively to refer to these benchmarks.

Various aspects herein were tested in simulation. We implemented our technique using TinyOS 1.x. While we tested our solution on real test beds, for ease of measurement and parameter tuning, we used TOSSIM simulator which allows simulating the code that runs on motes. TinyOS 1.x was used because we used the open source TinyTracer to generate interprocedural control flow which uses TinyOS 1.x. Our implementation is however version-agnostic and can be used in TinyOS 2.x without any modifications. The energy overheads are measured using PowerTOSSIM and the memory overheads are reported by avr-gcc compiler (TinyOS does not support dynamic allocation).

We ran our simulations for 7.5 minutes and 20 nodes including the base station node. The traces generated are stored in the external flash of the motes. The energy overhead and memory overhead reported are the averages over all nodes. As noted above, for several fault diagnostics, the control flow of send and receive events, which give hints on the message contents such as type of the message, is very helpful. Therefore, we show the tracing overhead for two configurations: (a) just messages are traced and (b) both messages and control-flow of send and receive events are traced. By send event control-flow, we mean the control-flow of the send and sendDone functions at the network layer. By receive event control flow, we mean the control flow of the receive event handler at the network layer and the application layer.

FIGS. 5A-5C show the energy overhead due to CADeT and Liblog when only messages are traced and when messages and send/receive event control flow are traced for all three benchmarks. We used a well-known trace compression algorithm called FCM (finite context method) to compress the traces before writing to the flash. We applied trace compression for both CADeT and Liblog. These results are shown as CADeT compressed and Liblog compressed.

We first observe that CADeT significantly reduces the energy overhead (up to 18× smaller) of message tracing compared to Liblog for all benchmarks. The savings increase when trace compression is used. Since CADeT uses fewer bits to record message sends and receives, CADeT savings accumulate as many messages are exchanged over time. Furthermore, CADeT encodes the entries such that they can be highly compressed as opposed to Liblog, which uses clocks that are not easily compressible.

Figure 6:
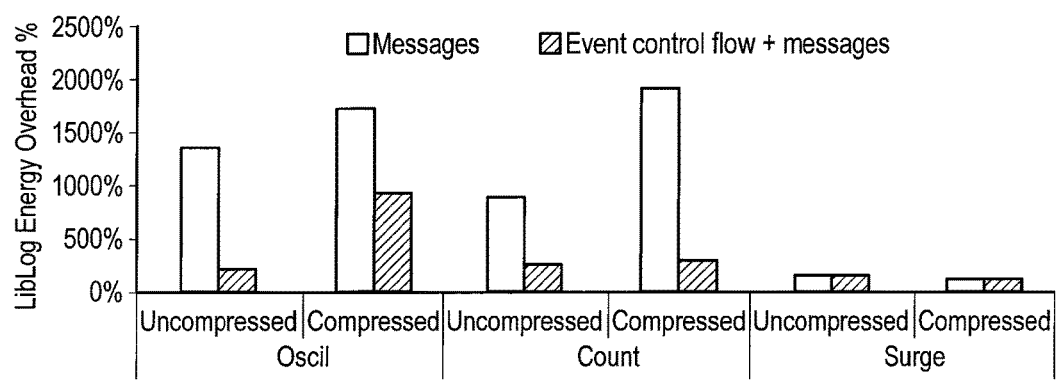
FIG. 6 shows an example of energy overhead of Liblog (comparative) compared to CADeT (inventive)

FIG. 6 compares Liblog's and CADeT's energy overhead directly by showing Liblog's energy overhead as a percentage of CADeT's energy overhead. Liblog uses up to 1366% of the energy used by CADeT for the uncompressed case and up to 1918% the energy of CADeT for the compressed case. As explained before, the energy savings are more pronounced in the compressed tracing case because of the compression awareness of CADeT traces. The smaller benefits for Surge are due to its low duty cycle, which means Surge is mostly idle and sends fewer messages, compared to other benchmarks.

FIG. 6 shows a comparison of Liblog (comparative) and CADeT (inventive) energy overheads. Liblog energy overhead is represented as percentage of CADeT energy overhead.

Since motes use Harvard architecture, which has separate program memory and data memory (RAM), we measured overheads on program memory and data memory. Data memory is extremely limited (4 KB in Mica motes and 10 KB in Telos motes). Program memory is limited too (128 KB in Mica motes and 48 KB in Telos motes).

FIGS. 7A and 7B show memory usage of CADeT (inventive) as a percentage of memory usage of Liblog (comparative).

FIG. 7A shows program memory requirements, and FIG. 7B data memory requirements, for CADeT as a percentage of corresponding requirements for Liblog. CADeT uses slightly more program memory (0.3% to 1%) due to its implementation complexity compared to Liblog. This increase is negligible. CADeT uses 3% to 13% more data memory than Liblog. The reason for the increase in data memory is that unlike Liblog, CADeT stores tables such as AAMap and PCMap in the memory. These additional requirements translate up to 300 bytes, which is moderate.

Below are discussed runtime debugging techniques proposed for traditional distributed systems as well as for WSNs. The runtime debugging techniques can be divided into offline techniques and online techniques based on whether the debugging is done postmortem or not.

Online monitoring and predicate detection techniques use external or internal monitoring agents observing the execution of the distributed system, e.g., by snooping messages. Similar solutions for WSNs have been proposed. While these techniques can give insight into the network in small-scale test deployments, they are not cost-effective for large WSN deployments as they require extra hardware—in some cases more powerful than the motes themselves. Furthermore, coordinating the monitors in a network as well as maintaining their correctness is non-trivial in large deployments. Remote debugging tools such as Marionette, Clairvoyant and Hermes allow the developer to examine the state of individual nodes and modify the behaviors of the nodes. HSEND is an invariant-based application-level runtime error detection tool for WSNs. The invariants are checked close to the source of the error avoiding periodic collection of data at the base station. An alert is sent to the base station only when there is a violation. Hermes is similar to HSEND but allows developers to modify invariants at runtime as well as deploy patches to fix violations. These approaches are complementary to our diagnostic tracing. Their limitation is that only the faults violating invariants can be diagnosed, and knowledge of failures is required for writing invariants.

Many offline, trace-based debugging approaches have been proposed for traditional (wired) distributed systems, which use model-based approaches, statistical approaches, or execution replay for diagnosis. Such techniques are inapplicable in the WSN domain due to the extreme resource constraints. In many of the above techniques, messages are traced by recording the contents of the messages along with the timestamps generated by Lamport clocks. Such traces can recreate the causal ordering of messages. Netzer et al. observed that only racing messages need to be recorded as others can be regenerated. They presented a mostly optimal tracing technique that uses vector clocks to identify racing messages online and record them. As mentioned before, vector clocks are too heavy-weight for WSNs, and logical clocks assume the presence of a reliable messaging layer such as TCP. Furthermore, logical clocks have high variability, which reduces opportunities for compression.

A tool called Sympathy periodically collects WSN information from all nodes at the basestation. The collected information is analyzed to detect node and link failures or partitions and localize their causes. PAD is similar to Sympathy but uses Bayesian analysis to reduce network monitoring traffic. Both Sympathy and PAD require collecting data often, even during correct operation. Moreover, the diagnosis is coarse-grained and is specific to node/link failures but cannot help much with complex faults like data races. NodeMD records system calls and context switches encoded in few bits to detect stack overflows, livelocks, and deadlocks. LIS proposes a log instrumentation specification language and runtime for systematically describing and collecting execution information. LIS is optimized to collect function calls as well as control-flow traces efficiently. TinyTracer proposes an efficient way to record all concurrent events and the interprocedural control-flow paths taken during their execution succinctly. TinyLTS proposes an efficient printf logging mechanism that allows the developer to log any runtime information. None of these four approaches handles node interactions. While the message sends and receives can be recorded locally, the ordering of messages cannot be recorded. Declarative TracePoints provide a uniform SQL-based query language interface for debugging and can simulate other trace-based approaches. Macrodebugging records traces of all variable values in a macro program of every node in the network. Macrodebugging works at macro level (network level) and cannot be used to diagnose faults at nodes. Unlike, CADeT does not require multiple reproductions of faults as well as instrumentation of specific events. We observe, however, that our approach is complementary to the machine learning techniques proposed in as CADeT traces can as well be used in.

According to various aspects herein, therefore, there is provided a message tracing scheme to record the distributed control-flow that is effective in diagnosis of complex distributed faults in WSNs while satisfying the resource constraints of WSNs.

In various aspects, a method of transmitting data includes initializing a storage element to hold a unique identifier. A packet of data and the value of the unique identifier are transmitted to a peer. The value of the stored unique identifier is stored in a memory (e.g., a CPU register), as are a representation of the packet of data, and an identification value corresponding to the peer. In various aspects, a value corresponding to a position in the sequence is stored in association with the identification value. The identification value and an indication that the packet was sent (which can have various formats, e.g., 'S') are stored in a trace buffer. A next unique identifier is determined using the stored corresponding value for that peer or using the stored unique identifier according to a defined identifier sequence. The defined identifier sequence can, e.g., skip integers, be non-monotonic, or change positively or negatively between values. The stored unique identifier is modified to a next sequence number, e.g., by incrementing, decrementing, or indexing into the sequence. In various aspects, the transmitter and receiver both store definitions of the sequence (e.g., as code or data) so that the receiver can determine, for each received packet, where that packet is in the sequence. This permits determining whether any packets were dropped or misordered in transit. The identifier sequence can be, e.g., monotonic or pseudorandom (e.g., using a pseudorandom number generator, PRNG). In some embodiments using a PRNG, each of the transmitter and receiver has the PRNG code and storage for a common random seed. The transmitting, storing, storing in trace buffer, and incrementing steps are then repeated a plurality of times.

In various aspects, a method of receiving data includes initializing a storage element to hold a unique identifier. This is a next expected sequence number and can be initialized to, e.g., zero. A packet of data and a packet-identification value are received from a peer, e.g., a computing device such as a wireless sensor node, via a network. The received packet-identification value is compared to the unique identifier. The packet-identification value is stored in a memory, as is an identification value corresponding to the peer. In a trace buffer, there are stored a representation of the packet of data, an identification value corresponding to the peer, and, if the received packet-identification value does not match the unique identifier, the received packet-identification value. If the received packet-identification value is further along the sequence than the unique identifier, the received packet-identification value is stored as the unique identifier. The stored unique identifier is then incremented by a fixed increment or otherwise advanced along the identifier sequence, and the above steps starting from packet receipt are repeated.

In various aspects, a network device includes a network interface and a processor configured to transmit or receive packets as discussed herein. The network device, as used throughout this disclosure, can be, e.g., a wired or wireless device. Examples include a router, a hub, a switch, nodes, or any other device that is configured to communicate with another network device by a network. The network device can include a sensor configured to provide data, and the processor can be configured to put sensor data in the payload of the packets. A network system can include a plurality of such network devices arranged to intercommunicate.

Herein is described the "TinyTracer." The control-flow traces generated by TinyTracer show the control-flow path executed within a node. In addition to tracing network messages, understanding control-flow within a node (e.g., how messages were processed by a node after receipt or how messages were generated by a node before sending) significantly improves the diagnostic ability of the traces. The traces generated by CADeT and TinyTracer can be combined and optionally compressed, e.g., as described below with reference to the "Prius" family of algorithms. The combined traces are referred to as "distributed control-flow traces." As demonstrated by the case studies discussed above, CADeT traces can be used to diagnose complex failures in distributed protocols.

Various aspects, referred to as "Prius," relate to generic hybrid trace compression for wireless sensor networks. These aspects can compress traces to reduce the storage space required. The term "Prius" refers to a family of algorithms with similar features. Use of the term "Prius" herein does not limit the scope of any claim to include any particular combination of features described in association with that term. Features useful with various aspects of Prius are not limited to those specifically identified as relating to Prius.

The techniques described herein can work with various compressors, including Dictionary coders such as those in the LZ family (e.g., LZ77, LZ78, LZW) or Byte-pair encoding, or Table based algorithms, including Value Prediction algorithms such as VPC3, finite context method (FCM), DFCM. Prius compression techniques can be used with CADeT timestamping by compressing CADeT traces with a Prius compressor. CADeT and Prius can also be used independently. Prius techniques can be used with lossy or lossless compressors, or any lookup-table-based compression algorithm.

Several diagnostic tracing techniques (e.g., event, power, and control-flow tracing) have been proposed for run-time debugging and postmortem analysis of wireless sensor networks (WSNs). Traces generated by such techniques can become large, defying the harsh resource constraints of WSNs. Compression is a straightforward candidate to reduce trace sizes, yet is challenged by the same resource constraints. Established trace compression algorithms perform unsatisfactorily under these constraints.

We propose "Prius," an algorithm named after the TOYOTA PRIUS hybrid car but not related in any way thereto. Prius is a novel hybrid (offline/online) trace compression technique that enables application of established trace compression algorithms for WSNs and achieves high compression rates and significant energy savings. We have implemented such hybrid versions of two established compression techniques for TinyOS and evaluated them on various applications. Prius respects the resource constraints of WSNs (5% average program memory overhead) whilst reducing energy consumption on average by 46% and 49% compared to straightforward online adaptations of established compression algorithms and the state-of-the-art trace-specific compression algorithm respectively. Various aspects herein relate to compression of traces such as those provided by CADeT.

Wireless Sensor Networks (WSNs) are being increasingly deployed in various scientific as well as industrial domains to understand the micro-behavior of physical phenomena. A few prominent deployments include habitat monitoring, volcano monitoring, precision agriculture, permafrost monitoring, and micro-climate monitoring.

WSNs are highly susceptible to deployment failures as they are deployed in situ in austere environments such as volcanoes or mountains. Unexpected failures have been observed in many deployments despite thorough in-lab testing prior to deployment. Even well-tested protocols have exhibited failures in the field.

Consider as an example the PermaSense deployment that monitors permafrost in the Swiss Alps. The deployment experienced severe performance degradation after running for 6 months (March 2009). Extensive resets of nodes, up to 40 resets per node per day, were observed for 3 months. The cause of the bug was a lookup task whose running time increased with the lifetime of the network, which after several months of deployment became large enough to cause node resets. The diagnosis took months and several expensive trips to the mountain top.

To cope with deployment failures, several run-time diagnostic tracing techniques have been recently proposed for WSNs that enable postmortem diagnosis. These techniques propose efficient recording of different types of traces such as function call traces, control-flow traces, event traces, and power traces. The traces generated by these techniques can provide insight into the execution at the time of failure and thus aid diagnosis. For the Permafrost deployment failure, the control-flow or function call trace would have shown the continuous execution of the lookup task, hinting to the problem.

The amount of trace information generated and collected by such approaches for diagnosis, however, increases rapidly with the number of components or events traced in the application. Large traces in the order of kilobytes put pressure on the storage as well as on the radio and consequently, the energy required to manage them.

FIG. 8 shows an example of energy overhead of uncompressed tracing. The y-axis shows energy overhead in % compared to the baseline case, in which no tracing is performed (i.e., energy consumption for the same application without tracing).

Consider the case of the TinyTracer, a control-flow tracer. FIG. 8 shows the energy overhead of uncompressed tracing of the main component of TinyOS applications as well as all components including the system components such as LEDs, sensor, radio, timer used by those applications for a 30 minute run (the benchmark applications are described in detail below). Note that many WSN faults reside in system components or the interactions between the main components and system components, demanding tracing into several components. The energy overhead for uncompressed tracing ranges from 3% (blink main component) to 135% (oscil all components) of the energy used to run the application for 30 minutes without tracing. This represents a significant overhead, which may hamper the feasibility of tracing.

To mitigate the overhead of tracing, a natural approach is to compress traces. The extreme resource constraints inherent to WSNs, however, pose novel challenges for compression. Established compression algorithms are either inapplicable or have to be adapted to satisfy the limits on memory and CPU resources. Adaptations of such established algorithms still perform poorly for WSN traces due to inherently small input buffers, which are only a few hundred bytes in WSNs, leading to few opportunities for learning the repeating patterns and replacing them.

The reasons for inherently small input buffers in WSNs are twofold. First, since traces are constantly generated with the execution, they have to be buffered in RAM before compression otherwise, computation-intensive compression may interfere with trace generation. After compressing a trace buffer, the compressed output has to be buffered in RAM as storage into non-volatile flash or transmission on the radio is slow. Due to the differences in execution speed between trace generation, compression, and transmission/storage, multiple buffers are needed. The small RAM (4 KB to 10 KB) and the requirement for multiple buffers limits the size of the individual trace buffers to a few hundred bytes. Second, reliable delivery of large buffers over an unreliable wireless multi-hop network in WSNs is expensive.

Existing WSN data compression algorithms such as SLZW or PINCO also achieve relatively poor performance as they cannot exploit the rich repetitions in traces as compression is performed independently on small buffers as explained earlier. (We quantify the poor performance of these compression algorithms below.) Poor performance of established compression algorithms explains why existing WSN tracing approaches either use simple, ad hoc techniques, or do not compress at all.

Herein is described "Prius", a hybrid (offline/online) approach to compress WSN traces generated by various tracing frameworks. Prius derives benefit from the following observations:

WSN computations exhibit a high degree of repetition in short time.

The repetitive patterns in WSN computations evolve only little over time.

WSN nodes often use a Harvard architecture and thus have separate program memory (e.g., EEPROM) and data memory (e.g., SRAM). While the latter memory is extremely scarce the former memory has more generous constraints and is rarely a bottleneck.

Various aspects of Prius thus advantageously capture the repetitive patterns of WSNs that occur in the traces using an offline training and include those patterns in the program memory using specially adapted data structures. The compression algorithm then uses these patterns to perform online compression. While rather intuitive, our approach is based on a careful balance, which our evaluation validates. While program memory can accommodate more patterns than data memory and thus potentially improve compression ratio, accessing such memory is typically 1.5× more costly than accessing data memory in both ATMELs AVR and TI's MSP430 architectures. The use of specialized data structures can counter-balance this increase by simplifying lookups considerably, but this does not support addition of patterns at runtime; such missing patterns may reduce compression performance. As we show, the energy savings obtained through higher compression rates outweigh the additional CPU costs. Furthermore, missing patterns are rare since WSN executions are repetitive and do not evolve much. More substantial changes in execution patterns arising from reprogramming a WSN can be handled by uploading a new set of patterns for the latest version of the software.

Our approach has several advantages. (1) By identifying patterns offline, the online phase is saved from doing heavy-duty mining. (2) Compression ratio is significantly improved by retaining the state information (dictionary) across small input buffers, which implies energy savings in transmission and storage of traces. (3) By storing patterns in the program memory—besides allowing more patterns to be stored—the precious RAM can be conserved for other components. (Moreover, flash storage technology used in program memory has improved more significantly in past years in terms of density and price than the SRAM technology used in data memory.) (4) The use of specific data structures reduces lookup time and saves space in storing the patterns. (5) Last but not least, our approach allows a wide range of established compression algorithms to be applied in the WSN context.

In addition to pinpointing the reasons for poor performance of established compression algorithms on traces, herein are described: a novel hybrid (offline/online) trace compression technique that enables established compression algorithms to be applied in the WSN context; and two realizations of hybrid techniques by hybridizing the popular FCM and SLZW compression algorithms respectively, and present their implementations.

This disclosure shows that our hybrid approach respects the resource constraints of WSNs (5% average program memory overhead) whilst reducing energy consumption on average by 46% and 49% compared to straightforward online adaptations of established algorithms and state-of-the-art trace compression algorithm respectively. We also show preliminary results with sensor data, illustrating the potential of our techniques beyond traces.

Herein is presented a brief overview of established compression algorithms and an analysis of opportunities and challenges for trace compression in WSNs, motivating the design of various aspects presented below.

Figure 9:
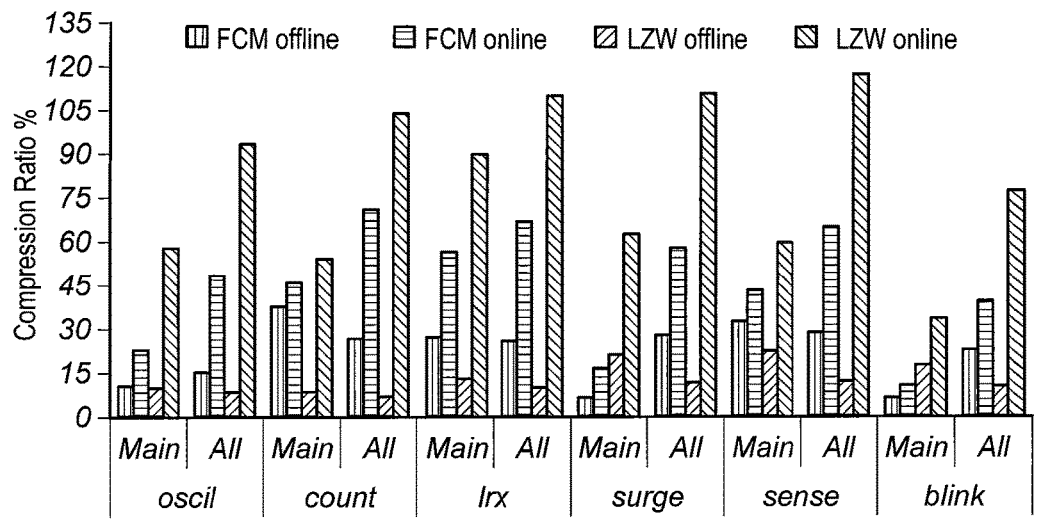
FIG. 9 shows a comparison of online and offline compression ratios.

FIG. 9 shows a comparison of online and offline compression ratios for FCM and LZW compression algorithms applied to control-flow traces generated by TinyOS applications. Smaller compression ratios are better.

We present an overview of three of the most widely used (trace) compression approaches, namely prediction-based, grammar-based, and dictionary-based compression.

Prediction-based compression uses value predictors to compress a stream of values. Only one or a few bits are needed to represent a value if the value can be correctly predicted. Otherwise, the original value is retained in the compressed stream. The prediction is based on the context table, which is updated as input is scanned. Finite context methods (FCM) is a highly effective value prediction technique used for trace compression, which we describe in more detail shortly when applying our technique to it.

Dictionary-based compression algorithms build a dictionary of repetitive patterns by scanning the input values and compress the input by replacing the patterns with the indices to the dictionary. Named after its inventors Lempel, Ziv, and Welch, the LZW algorithm is a well-known variant of the popular LZ family of text compression algorithms and is at the core of the Unix compress utility.

Grammar-based compression algorithms infer a grammar from the input text and produce that grammar as the compressed output. It has been shown that they are less effective than value prediction algorithms in trace compression. Therefore, we focus on the two former families.

To understand how well the targeted traces can be compressed with standard compression techniques, we collected 30 minutes of control-flow traces for various TinyOS applications (see benchmarks below). We compressed these traces offline on a desktop using both FCM, which we implemented in Python, and Unixs compress implementation of LZW. We refer to these as FCM offline and LZW offline respectively. Note that offline compression uses the whole 30 minute trace as input and stores very large dictionaries/tables of patterns as it is running on a desktop.

Online compression, which is compressing traces as they are generated on the WSN nodes using straightforward adaptation of FCM and LZW, was done for comparison with offline compression. We implemented FCM in nesC respecting the resource constraints of WSNs and incorporated it into TinyOS applications, so the traces can be compressed online. For LZW, we used SLZW, an LZW implementation in nesC proposed by Sadler et al. We collected the compressed traces for all the benchmarks. We refer to these as FCM online and LZW online. In contrast to offline compression, online compression uses small input buffers (192 bytes per buffer) and has limited dictionary/table storage as it runs on resource-constrained WSN nodes.

FIG. 9 shows the compression ratio using FCM and LZW both offline and online compression for different TinyOS applications in our benchmark suite. From this figure we see that LZW offline can compress the trace down to 6.9%-22.72% of the original size, which represents a 4.4× to 14.5× reduction in size. Similarly, FCM offline can reduce the size from 6.69% to 37.77% of the original size, which represents 2.6× to 14.9× reduction in size. It is clear that the traces are well compressible, yielding an opportunity to save a considerable amount of energy.

The standard compression algorithms, however, do not work well for trace compression in WSNs if they are adapted straightforwardly. From FIG. 9, we see that the compression ratio using LZW online is from 33.3% to 117% and for FCM online is from 10.5% to 70.5%. The compressed output can be larger than the input when the prediction is poor as encoding misprediction uses more bits than the original entry itself. We observe that there is a good scope for improvement for online compression (0.9× to 14× for LZW and 0.2× to 2.2× for FCM). For example, in the case of tracing all components in oscil, LZW offline can compress the trace 10.1× more than LZW online and FCM offline can compress the trace 3.2× more than FCM online.

In summary, high compressibility of traces is an opportunity. However, applying established compression algorithms like LZW and FCM straightforwardly in WSNs results in a poor compression ratio. As explained herein, the reason for poor performance is due to small input buffers and independence of compressed outputs, which allows independent decompression at the base station. Based on these observations, we present a novel generic hybrid trace compression approach below.

Several trace compression techniques have been studied in software engineering literature. The main ones include the value prediction algorithms (VPC) such as FCM-based ones. Grammar-based text compression such as Sequitur has been used successfully for compressing traces. The widely used Unix utility programs gzip (LZ77) and compress (LZW) have also been used for trace compression. However, these techniques are inapplicable for WSNs due to extreme resource constraints. Our hybrid approach enables the use of these techniques for WSNs.

Offline compression algorithms—algorithms that produce compressed output only after seeing the complete input—such as the ones proposed by Apostolico and Lonardi and by Larsson and Moffat explore how to reduce the compression ratio by compressing the whole file instead of using online techniques such as SLZW. In contrast, our technique does not perform offline compression but uses an offline phase to mine the patterns and compress them during an online phase. Offline compression is not applicable to traces because traces are generated with program execution and are not known beforehand.

Specialized compression algorithms have been similarly proposed for different scenarios in the context of embedded systems. One group of work focused on energy as a metric for compression and profiled various off-the-shelf algorithms. In contrast, our work proposes a novel hybrid compression technique that exploits program memory size. Another body of research focused on adapting standard compression algorithms such as LZW to resource-constrained embedded devices. However, these techniques are targeted at devices which still have much more memory than sensor nodes and do not have an offline phase to exploit program memory. One piece of work that comes close to our approach is by Netto et al. The authors use profiling for code compression. The similarity between that approach and ours is the use of a static dictionary. Unlike our work, Netto et al. however target code compression and do not make use of program memory to store large numbers of patterns as Prius does. Moreover, our work is generic and can be applied to any dictionary-based approach. Code compression has been studied in WSNs to reduce reprogramming cost. Such techniques aid Prius as they reduce the impact of large dictionaries in the program memory on reprogramming cost.

Several algorithms have been proposed in the context of WSNs for sensor data compression. Early pioneering work in this area exploited the high spatial correlation in dense networks. There have been several approaches that use in-network data aggregation. These efforts are orthogonal to our work as our work exploits temporal correlation in traces; we could make further use of such approaches for spatial correlation.

Sadler et al. proposed SLZW, a generic data compression algorithm—an adaptation of LZW to sensor nodes—and novel ideas to handle resource constraints such as mini-cache and data transforms. SLZW can handle varying data well. However, when applied to traces, it fails to capitalize on the rich amount of repetition; the major reason for this is the limited memory buffer. Furthermore, SLZW has high RAM requirements, e.g., in addition to input buffers 2 KB of RAM is required to store the dictionary. Our approach is designed specifically to exploit many such repetitions.

We earlier proposed TinyTracer, an interprocedural control-flow tracing of concurrent events and a simple trace compression approach. The only commonality between our approach and TinyTracer is the idea of mining patterns offline and using them for online compression. However, there are three major differences between the two works, which leads to significant benefits of our approach as demonstrated above. (1) We use program memory to store patterns mined offline as opposed to TinyTracer, which stores only two patterns in the data memory. (2) Determining the set of patterns that yields minimal compression size when patterns overlap is shown to be NP-complete. Unlike the ad hoc heuristic of using the top two patterns, our approach uses the table mined by established algorithms (e.g., LZW, FCM), which is more effective for trace compression as shown by our results. (3) Our approach uses efficient data structures suited for the compression technique (FCM, LZW) to conserve energy, while TinyTracer does not use efficient data structures and performs naïve pattern matching.

Table 4, below, shows an exemplary algorithm for compression of an N-character string. The terms "character" and "byte" herein refer to a symbol to be compressed and can include one or more bits, e.g., 8 bits. A selected context size of n is used. The algorithm uses a table or other data structure that maps context (n recently-seen symbols) to a prediction of the next symbol in the input. The first for loop fills a context buffer with the initial data and copies that data (with "0" flag bits to indicate prediction was not used) to the output. The first n symbols of input are not compressed by the algorithm in Table 4 because a full context is not available. Other aspects use a rolling context, or pre-fill the context buffer with a no-input symbol (e.g., "e").

The second for loop iterates over each of the N trace entries. PREDICT( ) can return a mispredict flag (e.g., nil or another value that cannot be equal to input[i]) if the context is not found in the table. In this way, absent context and mispredictions result in copying the data to the output with a "0" flag bit, and correct predictions result in appending a "1" flag bit. The flags are not required to be single bits or have the values shown in the algorithm in Table 4.

To prepare the table, the algorithm in Table 4 is executed on a training data set, and the output from APPENDBIT( ) and APPENDBYTE( ) is disregarded. To compress data, the algorithm in Table 4 is executed using the prepared table (which can be stored in a read-only memory), and the UPDATETABLE( ) calls are disregarded. The training dataset is preferably representative of typical trace data. If the same context occurs more than once in the training dataset, the table can be loaded with a prediction corresponding to a selected one of the occurrences of that context (e.g., the first occurrence or the last occurrence).

Table 6, below, shows an example of an algorithm working similarly to the algorithm in Table 4. To provide the dictionary (the table that can be stored in non-volatile memory to compress data), the algorithm in Table 4 is run and the output is disregarded. Once the dictionary is prepared, to compress data, the algorithm in Table 4 is run and the ADDTODICTIONARY calls are disregarded.

As discussed below, tables or dictionaries can be stored using lookup-efficient data structures, e.g., tries with a selected, fixed encoding. Tables or dictionaries can be transformed to a lookup-efficient form by a "miner," the routine providing the table or dictionary; by the node when it receives a dictionary or table in a less-lookup-efficient form; or by another computing device (e.g., a network hub).

Herein are presented challenges in "hybridizing" a compression technique; the high-level design of various aspects with respect to an abstract compression algorithm; some subleties of hybridization with respect to specific compression algorithms (by presenting the hybridization of FCM and LZW); and implementation details.

WSN computation is repetitive; its repetitive nature can be effectively captured offline and the captured information can be used during the online compression of traces. Based on this observation, it is possible to design a hybrid compression that mines the patterns offline and stores them in the data memory. However, such an approach cannot improve compression ratio significantly because not many patterns can be stored in the limited data memory. Moreover, the space occupied by the patterns cannot be used by other components for the lifetime of the WSN application. Even when the program memory is used to store patterns, it is important to store them efficiently such that lookup is fast. Since the number of patterns in the program memory stored can be large, sequential scanning of all the patterns in the program memory to find a pattern is CPU-intensive and may undermine the energy savings obtained by better compression. Therefore, hybridization has to be carefully done.

Figure 10:
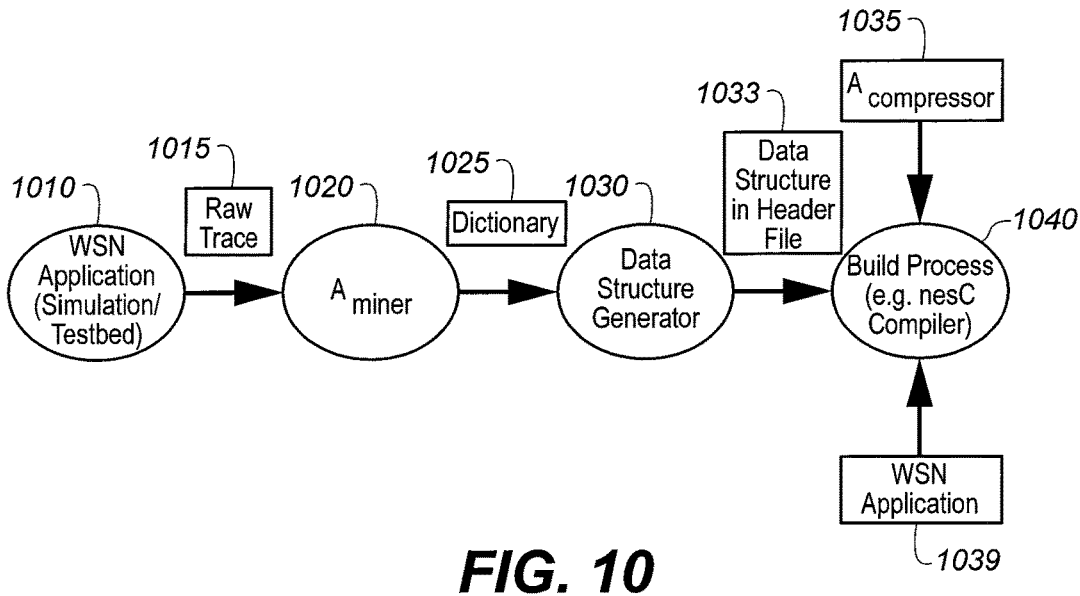
FIG. 10 is an exemplary flow diagram of trace compression techniques according to various aspects.

The high-level design of our approach is explained with respect to an abstract compression algorithm, denoted as A. First, we develop two modified parts of the original compression algorithm A, namely $A_{miner}$ and $A_{compressor}$. Given an uncompressed trace, the algorithm $A_{miner}$ outputs the internal data structure that is used for compression to a file in addition to compressing the input like the original algorithm A. Depending on the compression algorithm, the internal data structure could either be a table or a dictionary. An efficient data structure is designed such that it exploits the static nature of the patterns stored to reduce access time and/or storage space. A data structure generator would take the output of algorithm $A_{miner}$ and produce an encoding of the designed data structure in a header file. The algorithm $A_{compressor}$ is the version of algorithm A adapted to run on motes. Algorithm $A_{compressor}$ includes the header file as well as an interface with the designed data structure instead of the one used in algorithm A. The algorithm $A_{compressor}$ is lightweight because it doesn't need to identify, update or store patterns. FIG. 10 presents our design as a workflow diagram.

FIG. 10 is an exemplary flow diagram of Prius compression according to various aspects. Step 1010 is a WSN application that is simulated or measured to provide a raw trace 1015. Miner 1020 is run on trace 1015 to provide dictionary 1025, which can then be input to data structure generator 1030. The result is data structure 1033 encoded, e.g., in a C-language header file. Compressor code 1035, WSN application code 1039, and data structure 1033 are provided to a build process 1040, e.g., a compiler, to provide a finished WSN application implementing Prius trace compression.

Next we outline the FCM compression algorithm through an example and then present the steps to hybridize it, including the choice of an efficient data structure.

FCM (Finite Context Methods) is a highly effective value prediction technique that can be used for compression. A value is predicted based on a fixed number of preceding values, called the context. The number of preceding values, i.e., the size of the context, is configurable, and is added to the algorithm name. For example, if the context includes 3 preceding values, the predictor is called FCM-3. A lookup table is maintained to store predictions corresponding to a limited number of context patterns encountered in the past.

TABLE 4

FCM compression

```
1:  for i ← 0 to n do
2:      APPENDCTXT (context, input[i])
3:      APPENDBIT (output, 0)
4:      APPENDBYTE (output, input[i])
5:  end for
6:  for i ← n + 1 to N do
7:      if PREDICT (context)=input[i] then
8:          APPENDBIT (output, 1)
9:      else
10:         APPENDBIT (output, 0)
11:         APPENDBYTE (output, input[i])
12:         UPDATETABLE (context, input[i]) {Omit in hybrid}
13:     end if
14:     LEFTSHIFT (context, input[i])
15: end for
```

Table 4 shows an exemplary Finite Context Machine (FCM-n) algorithm according to various aspects. The algorithm takes as input a string of N characters and returns a compressed string as output. The algorithm assumes the presence of a table that stores the context and its corresponding prediction. Procedure PREDICT looks up the given context in the table. Procedure LEFTSHIFT left shifts the contents of the context once and appends the new input character. Procedure UPDATETABLE adds the context if it doesn't exist and otherwise corrects the prediction. Procedures APPENDCTXT, APPENDBYTE, APPENDBIT append the second argument to the first argument.

Specifically, given a value i to compress, its context is used to find the prediction from the table. If i matches the prediction, a '1' bit is inserted to the compressed stream to indicate prediction success. If i does not match the prediction or the context does not exist in the lookup table, a '0' bit followed by i is added to the compressed stream and the lookup table is updated to reflect the new prediction. Decompression is straightforward when a lookup table is maintained. If the bit read is '0', the value is read from the input. Otherwise, the value is identified from the lookup table. The FCM compression algorithm is shown in Table 4 and an example is shown in Table 5. In Table 5, bits are represented with overbar. The input characters are 8 bits long.

TABLE 5

| FCM-3 example | |
|---|---|
| Input | ABCDECDECDECDE |
| Output | $\overline{0}$A $\overline{0}$B $\overline{0}$C $\overline{0}$D $\overline{0}$E $\overline{0}$C $\overline{0}$D $\overline{0}$E $\overline{1}$ $\overline{1}$ $\overline{1}$ $\overline{1}$ $\overline{1}$ $\overline{1}$ |
| FCM Table | ABC → D BCD → E CDE → C |
| | DEC → D ECD → E |

The hybridization of FCM involves designing an efficient data structure for the dictionary to be stored in the program memory and creating a hybrid version of the FCM algorithm shown above which accesses the table efficiently. The latter is simpler for FCM as the only change needed to Table 4 is to omit line 12, which updates the dictionary. However, the procedure PREDICT has to be rewritten to access the table from the program memory.

The FCM table includes entries with n-character contexts and their predictions. The table can be represented using a simple array or a hash table. An array is efficient for small tables as scanning the array may be quicker than calculating hash functions with complex mathematical operators. Furthermore, an array uses less space. However, a hash table is preferable for larger tables (100s of entries) as the lookup cost quickly adds up. Our evaluation considers both array-based and hash table-based implementations.

We observe that the keys are static. Therefore, we can build a hash table without collision. In other words, we can use perfect hashing, which is a double hashing technique that avoids collisions. However, implementing perfect hashing for WSNs is quite challenging.

We describe how we have adapted a well-known open-source implementation of perfect hashing library, GNUs gperf, for WSNs. For a given set of strings, GNU's gperf produces a hash function and hash table, in the form of C or C++ code. The main challenge is that the input character set for gperf can only be alphanumeric characters. The naïve approach of converting the integer ASCII value (e.g. 143) to a string (e.g. '143') was expensive due to CPU intensive division and mod operations. Another approach is to store every ASCII value of a byte in the form of a string, which is expensive in terms of space. We converted the integer into string in hexadecimal representation (e.g. '8f'), which uses only shift operations and a lookup of each nibble. This enabled perfect hashing with gperf for WSNs. Next we outline the LZW compression algorithm through an example and then present the steps to hybridize it, including the choice of an efficient data structure.

LZW is a dictionary-based compression algorithm which builds a dictionary of repetitive patterns while scanning the input. The patterns found in the input are replaced (encoded) with indices to the dictionary. Since a pattern can be the prefix of other patterns, the pattern search continues until the longest pattern is found before encoding. New patterns are added to the dictionary. The LZW compression algorithm is shown in Table 6 and an example is shown in Table 7. In Table 7, the input characters are 8 bits long. The output characters are 9 bits. Decompression proceeds similar to the compression algorithm by maintaining a dictionary.

Table 6 shows an LZW algorithm according to various aspects. It takes a string of length N characters, input, and returns a compressed string in output. It assumes the presence of a dictionary that stores the pattern and its corresponding encoding. The dictionary is initially empty. Procedure LOOKUPDICTIONARY looks up the given context in the dictionary. Procedure ADDTODICTIONARY adds the pattern with a new encoding for that pattern. Procedure ENCODE returns the encoding of that pattern from the dictionary. Procedure APPEND appends the second argument to the first argument.

Figures 11A, 11B, 11C, 11D:
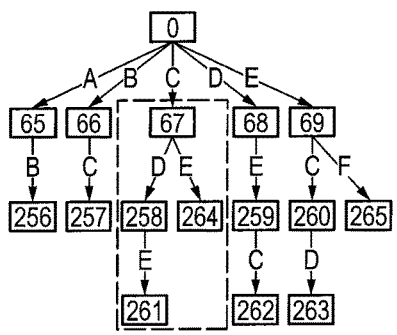
FIGS. 11A-11D show a comparison of array and trie data structures useful in LZW online and hybrid algorithms according to various aspects.

FIGS. 11A-11D show a comparison of data structures used in LZW online and hybrid algorithms Storage of some patterns is shown with arrows for clarity in FIGS. 11A and 11B (array data structure). Storage in a trie data structure with compact encoding is shown in FIGS. 11C and 11D. Memory layout of the subtree rooted at node 67 is shown with bold numbers along with the memory addresses on the left and encoding explanation on the right in FIG. 11D.

TABLE 6

LZW compression

1: pattern ← input[0]
2: for i ← 1 to N do
3:     newPattern ← APPEND (pattern, input[i]}
4:     if LOOKUPDICTIONARY (newPattern) ≠ nil then
5:         pattern ← newPattern
6:     else
7:         append (output, ENCODE (pattern))
8:         ADDTODICTIONARY (dictionary,newPattern) {Omit in hybrid}
9:         pattern ← input[i]
10:    end if
11: end for
12: APPEND (output, ENCODE (pat))

TABLE 7

LZW example

| Input | ABCDECDECDECEF |
| Output | 65 66 67 68 69 258 260 259 67 69 70 |
| LZW | AB → 256 BC → 257 CD → 258 DE → 259 |
| Dictionary | EC → 260 CDE → 261 ECD → 262 DEC → 263 |
| | CE → 264 EF → 265 |

Implementing the LZW algorithm in WSNs is not straightforward—especially maintaining a dictionary and looking up arbitrarily long patterns. SLZW is an efficient implementation of the LZW algorithm with an array-based data structure. Each entry in the array is a tuple (value, next, miss), in which, value stores the input character, next stores the pointer to the next entry in a pattern and miss refers to a new entry to further look for a matching pattern when the current pattern does not match. The dictionary initially contains 256 entries with each entry's value corresponding to its index and the next and miss pointers are initialized to 0.

FIGS. 11A and 11B show an example of the array-based data structure for dictionary in Table 7. To illustrate the data structure, consider the patterns "AB" to "CE" found in the LZW dictionary in Table 7. To store "AB", an entry 256 is created with value "B" and a link is created from entry 65 to entry 256 by storing 256 in the next pointer of entry 65. While other patterns until "CE" are stored in a similar way, storing "CE" uses a miss pointer. To store "CE", an entry 264 is created with value "E". Since the next pointer in entry 67, entry 258, is used to store "CD", the entry 264 has to be stored in the miss pointer of entry 258, thus creating a link between entry 67 and entry 264. To look up "CE", three lookups are needed. First, entry 67 is looked up. Since the value "C" matches, the next pointer, which is entry 258, is followed. Since the value of entry 258 is "D", the miss pointer, which is entry 264, is followed. Since the value of entry 264 is "E", the lookup correctly returns 264.

An advantage of this data structure is that it allows to store partial matches succinctly as well as quickly determine if a longer patterns exists in the dictionary. LZW always looks for longer pattern by appending to the existing pattern in the dictionary. Suppose the pattern "CD" is matched, checking whether the pattern "CDE" is present will start looking for the presence of "E" directly from the entry 258, corresponding to "CD" instead of checking from entry 67 corresponding to "C", the beginning of the pattern.

The hybridization of LZW involves designing an efficient data structure for the dictionary to be stored in the program memory and creating a hybrid version of LZW algorithm shown above which accesses the table efficiently. The latter is simpler for LZW as the only change needed to Table 6 is to omit line 8, which adds to the dictionary. However, the procedure LOOKUPDICTIONARY has to be rewritten to access the table from the program memory.

While the data structure described above for SLZW is quite efficient for online compression, it has a number of drawbacks when used for hybrid compression. First, since the patterns are known, the next and miss pointers storing 0 are unnecessary as no more patterns would to be stored. Second, when several patterns have common prefixes, the lookup cost of a pattern grows with the number of successors, which are patterns that have same common prefix but different current entries. For example, the patterns "CA", "CB", "CC" are successors of pattern "C". The lookup function has to iterate over the successors one at a time. Even if these are stored in some (ascending) order, binary search cannot be performed as they are stored as a linked list. We design an efficient data structure overcoming these issues.

A prefix tree, or trie, is an ordered tree data structure that is used to store an associative array. A trie data structure for the dictionary used in the example is shown in FIGS. 11C and 11D. The edges in the trie represent the input characters and the nodes represent the encoded dictionary values.

We observe that the LZW dictionary is static and exploit it for better performance as follows. First, since successors are known beforehand, only pointers to those successors are stored at any given node, thus avoiding miss pointers or next pointer with null values used in the array-based data structure described earlier. Second, we store the successor edges in ascending order to enable faster lookups using binary search. Finally, the trie can be compactly encoded (or tightly packed) in the memory. Such compact tries allow faster lookup of successors than array-based data structures by doing binary search on the children at a given node. Binary search is possible because the children can be stored at fixed offsets from each other allowing random access.

There are several ways to tightly pack a read-only trie in memory and we use one such efficient encoding presented by Germann et al. In this encoding the trie is represented bottom-up. Each node stores the number of children (1 byte), the node value (2 bytes), and then for each child, the edge value (1 byte) and the offset to that child. A complete memory layout of the encoding of subtree rooted at node 67 ("C") is shown in FIG. 11D. The beginning of each node is shown with a pattern filled box for clarity.

Accordingly, in various aspects, a method of compressing a set of trace data is provided. As noted above, the order of presentation is not limiting, the method can include automatically performing the following steps using a processor (e.g., processor 2086, FIG. 20), and specifically-identified components or algorithms are exemplary.

First, a compression table is stored in a memory (e.g., NVRAM or another storage element). The compression table corresponds to results of processing a set of training trace data using a table-driven compression algorithm. The compression table can be provided, e.g., by executing the algorithm of Table 4 or of Table 6 and collecting the tables updated by UPDATETABLE (Table 4) or ADDTODICTIONARY (Table 6).

In various aspects, a set of trace data is provided or received. For example, the set of trace data can be determined and include at least one control-flow trace data element and at least one network trace data element. Other trace data, or non-trace data, can also be provided.

Subsequently, the set of trace data is compressed using the stored compression table according to the table-driven compression algorithm. During the compression, the stored compression table is accessed in a read-only manner. The table-driven compression algorithm can be, e.g., a finite-context-method (FCM) or Lempel-Ziv-Welch (LZW) algorithm.

In the example of FCM compression, this can be as noted above with respect to Table 4, line 12, "Omit in hybrid." That is, while the data are being compressed, PREDICT steps are being performed to read the compression table, and APPENDBIT and APPENDBYTE calls are being performed to provide the compressed data. However, UPDATETABLE (line 12) is not being performed. Therefore, the compression table does not change, i.e., is read-only, while compression is being performed.

In the example of LZW compression, this can be as noted above with respect to Table 6, line 8, "Omit in hybrid." During LZW compression of, e.g., trace data, LOOKUPDICTIONARY and APPEND calls happen as usual, but ADDTODICTIONARY calls (line 8) do not. Therefore, the LZW dictionary is read-only during the compression.

After compression, the compressed set of trace data can be stored, e.g., in the memory. The compressed set of trace data can also or alternatively be transmitted via a network interface, e.g., interface 2015, FIG. 20. The compressing step can be repeated for each of a plurality of sets of trace data. The storing and compressing steps can also or alternatively be repeated with respect to a second compression table different from the compression table. This can permit compensating for trace divergence, as discussed herein. The method can further include decompressing the compressed set of trace data using the stored compression table. The decompression can be performed using a network device or desktop computer, or using a different data processing system.

In various aspects, the storing step includes receiving a pre-table and automatically transforming the pre-table to the compression table in a lookup-efficient form before storing the compression table in the memory. The pre-table can be the output of the table-driven compression algorithm. In an example in which the table-driven compression algorithm uses fixed-length sequences of input trace data (e.g., FCM), the transforming includes determining a hash table mapping values of the sequences to corresponding predictions. In an example in which the table-driven compression algorithm uses a dictionary of patterns of values of input trace data, the transforming includes determining a trie of patterns in the dictionary, wherein the nodes of the trie store entries in the dictionary and edges of the trie are labeled with corresponding ones of the values of the trace data.

In various aspects, a method of determining a compression table includes the following steps. As noted above, the order of presentation is not limiting, the method can include automatically performing the following steps using a processor (e.g., processor 2086, FIG. 20), and specifically-identified components or algorithms are exemplary. First, a set of training trace data are processed using a table-driven compression algorithm, so that a compression table is produced. Examples of training trace data are discussed herein, e.g., with reference to block 1010 (FIG. 10).

Second, the compression table is transformed into a lookup-efficient form. This can be as discussed above with reference to, e.g., perfect hashing for LCM, or array or trie structures for LZW (FIGS. 11A-11D).

In various aspects, the method further includes transmitting the transformed compression table via a network interface.

The method can further include repeating the processing and transforming steps with respect to a second set of training trace data different from the set of training trace data. This can permit correcting for trace divergence by regenerating the compression table using new training data.

In various aspects, the method further includes compressing a set of trace data using the transformed compression table according to the table-driven compression algorithm. The transformed compression table is accessed in a read-only manner during the compressing. In some of these aspects, the method further includes determining the set of trace data including at least one control-flow trace data element and at least one network trace data element.

In various aspects, a network device is configured to, e.g., compress data using a stored compression table. Such a network device can include a network interface, a memory, and a processor. The processor can be adapted to store a compression table in the memory. The compression table can correspond to results of processing a set of training trace data using a table-driven compression algorithm such as algorithms described above (e.g., Table 4 or Table 6).

The processor can be further configured to compress a set of trace data using the stored compression table according to the table-driven compression algorithm. The processor is configured to access the stored compression table in a read-only manner during the compressing.

The processor can be yet further configured to transmit the compressed trace data via the network interface.

The network device can further include a sensor. The processor can be further configured to receive sensor data from the sensor and determine the set of trace data including the received sensor data.

In various aspects, the set of trace data includes at least one of a control flow trace data element, an event trace data element, a power trace data element, or a function call trace data element.

In various aspects, the processor is further configured to determine the set of trace data including at least one control-flow trace data element and at least one network trace data element. The processor can, e.g., carry out a tracing algorithm that provides control-flow data (e.g., TinyTracer), and also carry out a tracing algorithm that provides network trace data (e.g., CADeT). The processor can save the traces from each of these algorithms and compress and transmit them.

We implemented the offline compression algorithms presented above in Python and C. For the online and hybrid versions of the algorithms, we used nesC version 1.3.2 and TinyOS 1.x. While implemented for TinyOS 1.x, our approach is OS agnostic and can be easily adapted to other WSN OSs including Contiki or SOS.

Regarding FCM, the offline version of FCM, was implemented in python and the online version of FCM, in nesC. We implemented hybrid versions of FCM, $FCM_{miner}$ in Python and $FCM_{compressor}$ in nesC. We also implemented two variations of $FCM_{compressor}$ namely, Hybrid simple and Prius that use simple and efficient data structures to represent the table in program memory respectively. $FCM_{miner}$ dumps the dictionary in a header file which is then converted into efficient data structure by a script such that Prius could use it. Hybrid simple simply uses the dumped header file as is.

Regarding LZW, we downloaded the SLZW code from. SLZW has a mini-cache to reduce compression size further. We left the mini-cache on and allowed the input to expand. We used the SLZW code as is for the online version.

We implemented hybrid versions of SLZW similar to FCM. We modified SLZW code to create $SLZW_{miner}$, which does not use mini-cache, and dumps the dictionary to a file. Similarly, we created $SLZW_{compressor}$, that uses the dictionary from the file instead of creating its own dictionary. We implemented two variations of $SLZW_{compressor}$, analogous to $FCM_{compressor}$, namely, Hybrid simple and Prius.

Our evaluation demonstrates how our generic hybrid trace compression technique Prius enables the use of various well-known compression techniques in the WSN context. In particular we substantiate our previous claims, namely, (1) hybridization using program memory is effective and (2) efficient data structures are useful for improving the effectiveness of hybridization.

We evaluated the previously outlined hybridized versions of the established dictionary-based compression algorithms FCM and SLZW in nesC for TinyOS. For each of these algorithms, we evaluated two variations of hybrid versions, namely, Hybrid simple and Prius that respectively use simple and efficient data structures to represent the dictionary/table in program memory respectively. For comparison, we implemented online (Online) and offline (Offline) versions of these algorithms if the implementations are not publicly available.

Prius can be applied to different types of runtime traces. We used the diagnostic concurrent interprocedural control-flow trace produced by the state-of-the-art tracing solution, TinyTracer that is publicly available and can record traces generated by multiple system components. TinyTracer includes a simple trace compression algorithm (TinyTracer), which is based on two simple techniques: (1) mining the top two frequent patterns of size up to 26 bytes offline and using those for online compression; (2) using run-length encoding. We compared Prius to TinyTracer quantitatively here and qualitatively below. For validity, we evaluated our compression techniques for other traces including another state-of-the-art tracing solution, LIS and a real sensor dataset from environmental monitoring deployment. Since Online algorithms gain with larger input buffers, we also evaluated large buffer effect.

We use four metrics—smaller values are always better:

Compression ratio—quantifies the reduction in the trace size. It is defined as the ratio between compressed and uncompressed sizes and is represented as a percentage.

Energy overhead—quantifies the increase in the amount of energy required to trace an application. It is defined as the additional energy required to trace an application and is represented as a percentage of energy consumed by the base application without tracing.

Program memory overhead—quantifies the additional program memory required to hold the table of patterns mined offline. It is represented as a percentage of program memory required by the application with compression turned off.

Data memory overhead—quantifies the additional RAM used.

Our main results show that Prius achieves high compression rate (up to 68% for FCM and 86% for LZW) and significant energy savings (up to 68% for FCM and up to 90% for LZW) compared to straightforward adaptations of compression algorithms. Similarly, Prius achieves high compression rate (up to 72% for FCM and 77% for LZW) and significant energy savings (up to 96% for FCM and 70% for LZW) compared to TinyTracer, the state-of-the-art WSN trace compression technique. The energy savings from writing fewer bytes to Flash thus outweighs the overhead of running the compression algorithm or accessing program memory.

The program memory overhead due to storing the dictionary/table is modest (up to 24% for FCM, 20% for LZW). The data memory overhead is due to memory buffers used to store the inputs, compressed outputs, and the dictionary to store patterns. The buffers for storing inputs and compressed outputs are the same for both hybrid and online (Online) compression techniques. However, the dictionary or table in the online algorithms (2 KB for SLZW and 0.5 KB for FCM) use precious RAM, whereas, Prius (all hybrid) doesn't incur this overhead and thus we don't discuss this metric further.

We used TOSSIM for the reported results due to the difficulty of performing energy measurements directly on the hardware and problems with emulators. Avrora has well-known problems in flash energy estimation. ATEMU emulations showed to be problematic when accessing program memory for large programs and no support is available.

We implemented hybrid versions of both the FCM and SLZW algorithms in nesC for TinyOS 1.x and integrated it with TinyTracer so our compression implementation is used to compress traces instead of the default compression in TinyTracer. We collected the uncompressed trace for 15 minutes by simulating each of the benchmarks in TOSSIM for a simple 4-node network. The trace is stored in the flash at the end of the simulation. This raw trace was used to get Offline results and for mining the patterns for hybrid versions. For mining patterns, we used the first half of these traces. To get the compressed results for Online, TinyTracer, Hybrid simple and Prius, we simulated the application for 15 minutes using TOSSIM for a 4-node network in grid topology. Since the benchmark application repeats every few seconds, 15 minutes are representative of the long-time behavior for the application.

We used PowerTossim to measure the energy consumption of the simulation. Since TOSSIM doesn't distinguish between program memory and data memory, the energy overhead in accessing program memory is measured as follows. Every program memory access requires 1.5 CPU cycle whereas access to data memory takes 1 CPU cycle in ATMEL AVR architectures. Therefore, we instrumented the code to count the number of memory accesses to the table in program memory. We incremented the CPU cycle count by 0.5 times the number of memory accesses in PowerTossim results. The traces are obtained from the flash file. We used a trace parser that measures the size of the traces.

For our evaluation, we chose as benchmarks five default TinyOS 1.x applications that are widely studied by others, as well as a large TinyOS application, LRX, which is a module for reliable transfer of large data developed as part of the Golden Gate Bridge monitoring project and is one of the largest nesC

TABLE 8

The TinyOS 1.x applications in our benchmarks suite. C LOC is the lines of C code generated by nesC compiler.

| TinyOS application | Alias | Description | Period (s) | C LOC | System components used |
|---|---|---|---|---|---|
| Blink | blink | Toggle the LEDS | 1 | 2061 | LEDs, timer |
| Sense | sense | Samples sensors and displays it on LEDS | 0.5 | 3730 | LEDs, sensor, timer |
| Oscilloscope | oscil | Data collection with high sensing rate | 0.125 | 5956 | LEDs, sensor, UART, timer |
| Surge | surge | Data collection with medium sensing rate | 2 | 11358 | LEDs, sensor, radio, timer |
| CntToLeds-AndRfm | count | A counter that broadcasts and displays count | 0.25 | 8241 | LEDs, sensor, radio, timer |
| LRX | lrx | Reliable large data transfer application | 2 | 10015 | LEDs, radio, timer | components (~1300 lines of nesC code) in TinyOS 1.x. We used SingleHopTest to drive the LRX module. These six benchmarks are described in Table 8.

TinyTracer allows tracing multiple nesC components at the same time and can handle high throughput trace generation. To study the effect of compression on larger traces, we traced all the nesC components included in an application and these include the main component (e.g., SurgeM for Surge) as well as the system components such as LEDs (e.g., LedsC), sensor (e.g., PhotoTempM), radio (e.g., AMStandard or MultihopEngineM), and timer (e.g., TimerM). For every benchmark, we traced all the components starting with one component and gradually adding additional components until all components are traced. Table 8 shows the system components used by each benchmark. The order in which the components were included in the simulation is the following: main, LEDs, sensor, radio or network layer, and lastly timer. For example, 'surge-1c' in the results means just the main component is being traced whereas 'surge-3c' means that the main, LED, and sensor components are being traced.

FIGS. 12A-12F, FIGS. 13A-13F, and FIGS. 14A-14F respectively show the compression ratio, energy overhead and program memory overhead for various online (Online), hybrid (TinyTracer, Hybrid simple, Prius) and offline (Offline) versions of FCM compression algorithm applied to control-flow traces generated by TinyTracer for TinyOS applications in our benchmark suite.

FIGS. 12A-12F show compression ratios for various online, hybrid and offline versions of FCM compression algorithms applied to control-flow traces generated by TinyOS applications. The smaller the compression ratio, the better the compression is.

FIGS. 13A-13F show energy overhead for various online and hybrid versions of FCM compression algorithms applied to control-flow traces generated by TinyOS applications.

We first observe from FIGS. 12A-12F that both Hybrid simple and Prius (inventive) compress the input well compared to Online (comparative), showing that hybridization pays off. The improvement in compression ratio for Prius over Online ranges from 18% (lrx-2c) to 68% (count-4c) and the average improvement over all benchmarks is 45%. In other words, the traces produced by Online are 22% to 215% (average 102%) bigger than the traces produced by Prius for the benchmarks. Hybrid simple also shows similar improvement of compression ratio over Online. This is due to the many patterns that can be stored in the dictionary or table in the program memory as opposed to data memory used by Online algorithms.

Similarly, the improvement in the compression ratio for Prius (inventive) over TinyTracer (comparative) is on average 31% and up to 72% (surge-5c). In other words, the size of the trace generated by TinyTracer is on average 66% larger and up to 252% (surge-5c) larger. When tracing only one or fewer component(s), for benchmarks like blink or surge, TinyTracer generates up to 17% (surge-1c) smaller traces than Prius because the trace mostly includes the top two frequent patterns used by TinyTracer. However, as the number components traced increase, many patterns appear in the trace making TinyTracer's compression largely ineffective. Thus, this result substantiates the claim that many patterns need to be stored to get effective compression and since data memory is precious, program memory needs to be used.

The improvement in compression ratio translates to considerable energy savings for Prius as shown in FIGS. 13A-13F. in energy overhead due to Prius (inventive) over Online (comparative) ranges from 17% (sense-1c) to 68% (oscil-5c) and the average is 46%. Similarly, the reduction in energy overhead due to Prius over TinyTracer is up to 96% (surge-1c) and the average is 49%. The average reduction in energy overhead due to Prius (inventive) over Online and Tiny-Tracer (both comparative) increases to 56% and 59% respectively when all components are traced. The reason for energy savings is that smaller traces result in fewer writes to flash storage and since energy required to write to flash is orders of magnitude more than CPU, saving flash writes conserve energy significantly.

The cost of hybrid approaches is in the program memory overhead, which is shown in FIGS. 14A-14F. The increase in program memory due to Prius (inventive) over Online (comparative) ranges from 0.8% (surge-1c) to 32% (lrx-4c) and the average increase over Online across all benchmarks is about 6%. Similarly, the increase in program memory due to Prius over TinyTracer (comparative) ranges from 0.7% to 32% and the average is 5%. We observe that Hybrid simple does not incur much overhead with average only 0.2% and maximum of 7%. We think the reduction in compiler inlining has compensated the increase due to the dictionary. However, the cost of lost inlining is insignificant as can be seen from the energy overhead results.

We observe that the compression ratio obtained by hybrid techniques Prius and Hybrid simple (both inventive) is close to the Offline (comparative) compression ratio as most of the patterns used by Offline are known to hybrid techniques as well. It is interesting to note that for some benchmarks (e.g., surge), hybrid versions have slightly better compression ratio than Offline. This is because the offline algorithm takes some time to learn the patterns from the input and therefore, first several entries in the input are not compressed. In contrast, Prius and Hybrid simple start compressing from the first input character.

FIGS. 14A-14F show program memory overhead for various online and hybrid versions of FCM compression algorithms applied to control-flow trace generated by TinyOS applications.

While Hybrid simple compresses traces as well as Prius, Prius saves energy over Hybrid simple because perfect hashing reduces lookup time considerably. The energy overhead reduction of Prius over Hybrid simple is on average 30% and up to 78% (lrx-4c). Hybrid simple is competitive (~10%) when only one or few components are traced as the number of patterns in such cases is small. For one benchmark (sense-1c), Hybrid simple even reduces energy overhead over Prius by 12%. When the number of components traced and thus the number of patterns increases though, the efficient data structure in Prius clearly reduces energy overhead.

The average reduction in energy overhead due to Hybrid simple (inventive) over Online (comparative) is only 17% despite much higher compression achieved by Hybrid simple. The reason is that sequential scanning of a program memory table can be very CPU-intensive for large tables. For example, benchmark lrx-4c is a degenerative case for Hybrid simple because the energy overhead was larger than the energy overhead of uncompressed tracing. lrx-4c is the most complex benchmark in our suite and has a large number of patterns. However, even when lrx-4c is regarded as an outlier and omitted, the average reduction in energy overhead of Prius over Hybrid simple (both inventive) is 27%. Thus, we see that efficient data structures are very helpful for effective hybridization, particularly for cases like lrx-4c.

Figure 15A:
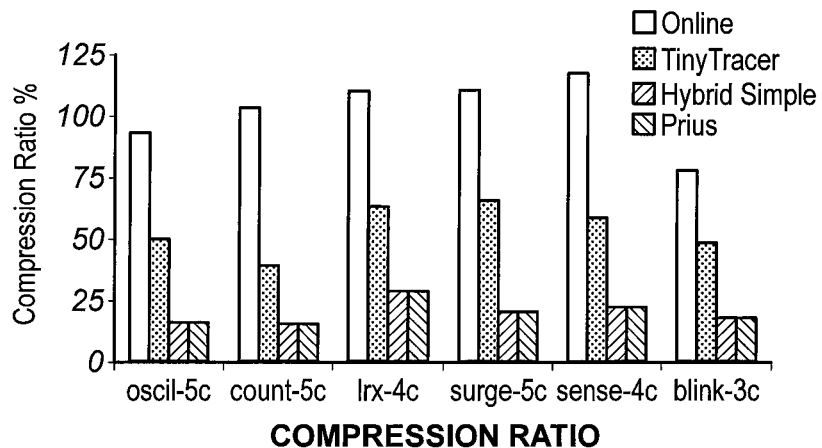
FIGS. 15A-15C show performance of exemplary comparative and inventive LZW compression algorithms.
Figure 15B:
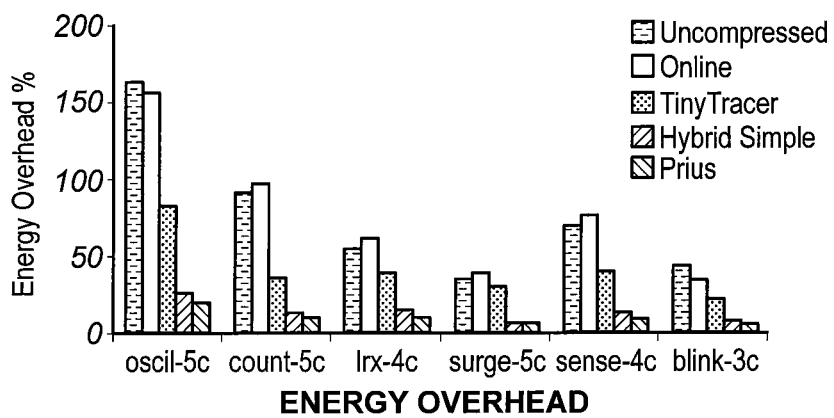
Figure 15C:
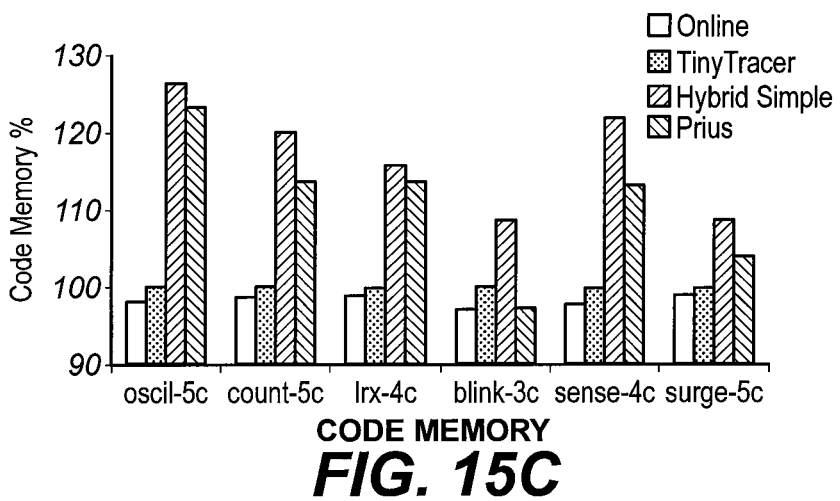

Since the results for the LZW compression algorithm follow the same trend as FCM and in the interest of space, we show the results for all benchmarks in the case when all the application components are traced. FIGS. 15A, 15B, and 15C respectively show the compression ratio, energy overhead and program memory overhead for various online (Online, comparative), hybrid (TinyTracer, Hybrid simple, Prius, inventive) and offline (Offline, comparative) versions of the SLZW compression algorithm applied to control-flow trace generated by TinyOS applications in our benchmark suite. In LZW, the input could expand if there are not enough repetitions and this happened for a few benchmarks for Online.

FIG. 15A shows compression ratio, FIG. 15B shows energy overhead, and FIG. 15C shows program memory overhead of LZW compression algorithms applied to control-flow trace generated by TinyOS applications.

The improvement in compression ratio for Prius (inventive) over Online (comparative) ranges from 74% (lrx-4c) to 86% (count-5c) and the average improvement over all benchmarks when all components are traced is 81%. The reason for this improvement is the limited dictionary size in the Online algorithm. This improvement in compression ratio translates to considerable energy savings ranging from 82% (lrx-4c) to 90% (count-5c) and the average energy savings is about 85% over all the benchmarks. Hybrid simple (inventive) showed similar compression ratio (average of 81%) and energy savings (average of 80%). The improvement in compression ratio for Prius (inventive) over TinyTracer (comparative) ranges from 72% (lrx-4c) to 77% (surge-5c) and the average is 75% over all benchmarks. This improvement in compression ratio translates to considerable energy savings ranging from 55% (lrx-4c) to 70% (surge-5c) and the average is 64%.

The program memory overhead for Prius (inventive) over Online (comparative) for all the benchmarks ranges from 0.3% (blink-3c) to 26% (oscil-5c) and the average is 13%. For Hybrid simple, it ranges from 10% (surge-5c) to 29% (oscil-5c) and the average is 19%. Similarly, the average program memory overhead for Prius over TinyTracer is 11%. Thus, the program memory increase is modest.

Prius saves energy and program memory overhead when compared to Hybrid simple as expected. The energy savings for Prius over Hybrid simple (both inventive) over all benchmarks when all components are traced ranges from 4% to 33% and the average is 24%. The average program memory savings for Prius over Hybrid simple ranges from 2% to 10% and the average is 5%. Savings are limited due to the fact that Hybrid simple already uses an efficient data structure unlike FCM, which uses a naïve data structure based on a simple array. If a naïve array is used in SLZW, significant savings can be obtained as it is expensive to find longest matches in an array of patterns.

Figure 16:
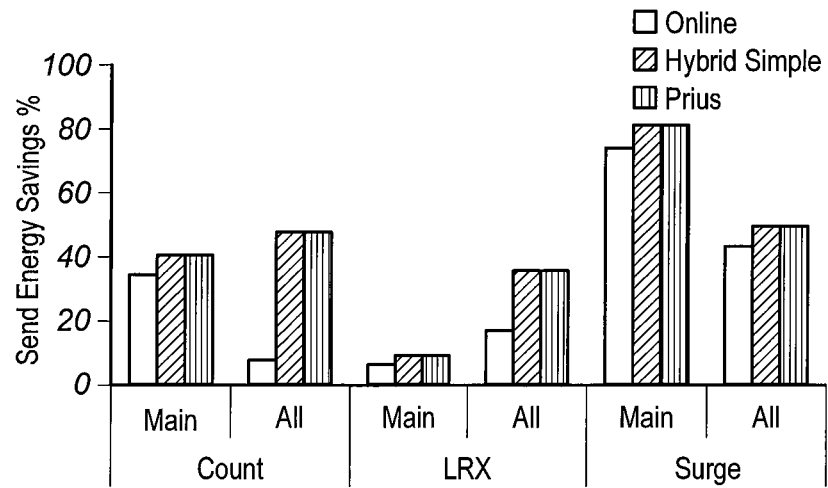
FIG. 16 shows energy savings for transmitting FCM compressed traces according to various comparative and inventive algorithms.
Figure 17:
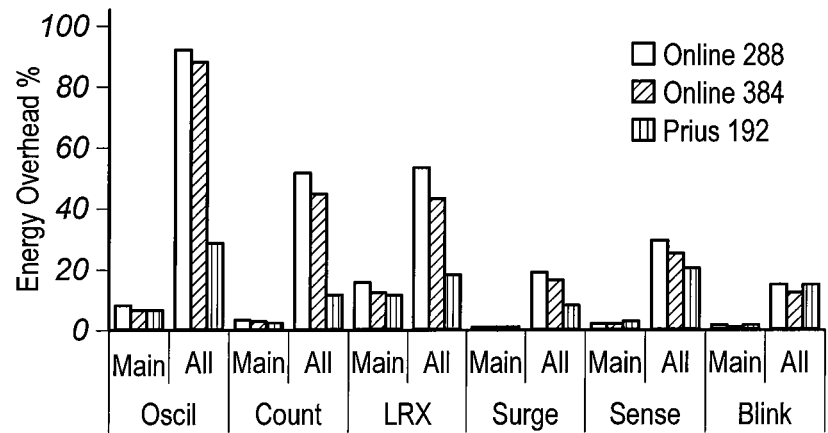
FIG. 17 shows energy overhead for traces compressed in large buffers according to various comparative and inventive algorithms.
Figure 18:
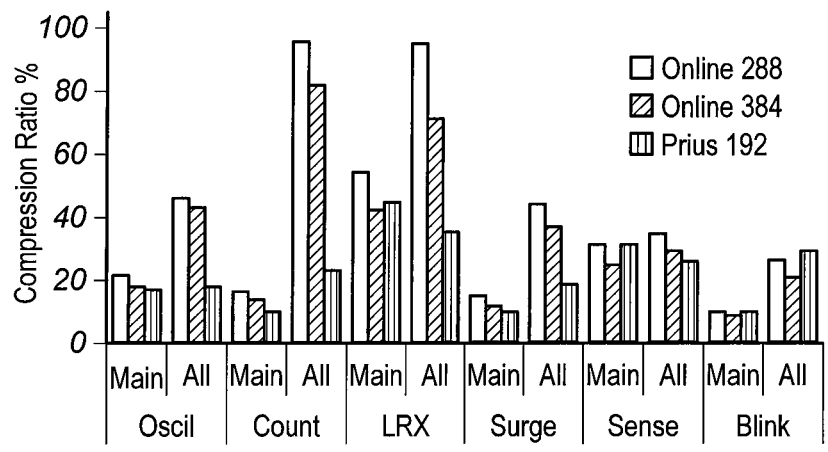
FIG. 18 shows compression ratios for traces compressed in large buffers according to various comparative and inventive algorithms.

FIG. 16 shows energy savings for transmitting FCM compressed traces. FIG. 17 shows energy overhead for traces compressed in large buffer. FIG. 18 shows compression ratio for traces compressed in large buffer.

We have set the input buffer size to be 192 bytes in the results discussed so far. We recall that three input buffers are needed for tracing and compression. Two buffers are used to store the trace as it is generated. When one buffer is full, the other buffer stores the trace generated and the filled buffer is compressed. A third buffer is used to store the compressed output before it can be stored in the flash/sent on the radio. The RAM size and the need for three buffers forces each individual buffer size to be only few hundred bytes. Even if the size of input buffer is doubled, the conclusions still hold.

We study the effect of input buffer sizes of 288 and 384 bytes. As noted above, the total increase in RAM requirements will be thrice the input buffer size. When the input buffer size is increased, the online compression algorithm will perform better as larger inputs provide more chance to identify and replace patterns in the buffer. However, it will not affect hybrid algorithms that much. Therefore, we compared Online with two larger input buffers (Online 288 and Online 384, both comparative) against Prius (inventive) with 192 bytes. We used FCM and the results are shown in FIGS. 17 and 18.

FIG. 18 shows that the increase in buffer size from 288 (Online 288) to 384 (Online 384) bytes improves the compression ratio up to 25% and energy overhead up to 20% (both are comparative). Except for blink-All, the improvement in compression ratio due to Prius over Online 288 ranges from 18% to 76% and the reduction in energy overhead ranges from 23% to 78%. Similarly, except for a few benchmarks (blink, sense-Main, lrx-Main), the improvement in compression ratio due to Prius (inventive)

over Online 384 (comparative) ranges from 3.16% to 72.21% and the reduction in energy consumption ranges from 9% to 75%.

Online performed better on benchmarks with few patterns. For those benchmarks, the improvement in compression ratio due to Online 384 over Prius ranges from 5% (lrx-Main) to 28% (blink-All) and reduction in energy overhead ranges from 12% (blink-Main) to 24% (sense-Main).

From these results, we conclude that while increased input buffer sizes help Online, Prius (inventive) performs much better than Online 384 (comparative) in many cases even with 192 bytes input buffer.

Next we study the overhead of sending traces over the radio as opposed to writing to flash. We show that hybrid compression algorithms save more transmission energy than online compression algorithms.

We estimate the crucial energy overhead, which is the energy used by the radio for transmitting traces from a node instead of the total radio energy. By excluding the energy overhead required to obtain a radio channel, which varies depending on the network traffic and environment or the energy spent by the packet in the network stack, we can have a fair comparison between the two compression algorithms We used the power logs generated by PowerTOSSIM to estimate the transmission energy overhead. More precisely, we found the time intervals when the radio is in transmitting state and used the energy model for mica2 motes available in PowerTOSSIM for determining the current consumption.

FIG. 16 shows the savings obtained by compression in the transmission energy overhead due to tracing. Each bar represents the percentage of energy savings over uncompressed tracing energy. In the interest of space, we only show for two configurations of benchmarks that use radio.

We first observe that the savings from any compression ranges from 7% to 81%. The average savings due to Online (comparative) is 29% and due to Prius or Hybrid simple (both inventive) is 43.5%. Next, we note that the savings due to inventive hybrid compression Prius and Hybrid simple over comparative online compression Online is 2.77% (lrx-1c) to 43.5% (count-5c) and the average is 19.8%. The Prius and Hybrid simple (both inventive) have similar energy savings because they compress the trace equally well and the CPU energy overhead is not included in this metric. We note that the energy savings shown are for a single node and the savings add up at every hop if the trace is transmitted over a multi-hop path to the base station.

Figure 19A:
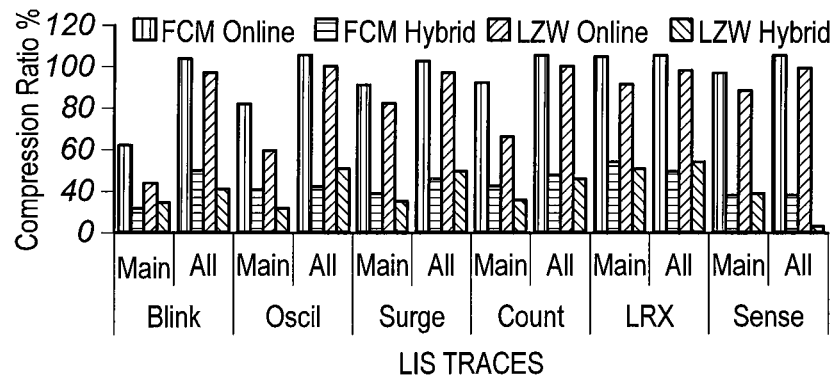
FIGS. 19A, 19B, and 19C show compression ratios for various types of data according to various comparative and inventive algorithms.
Figure 19B:
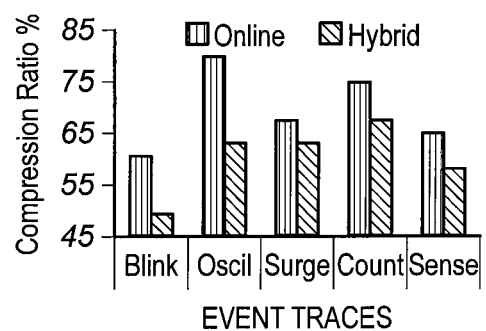
Figure 19C:
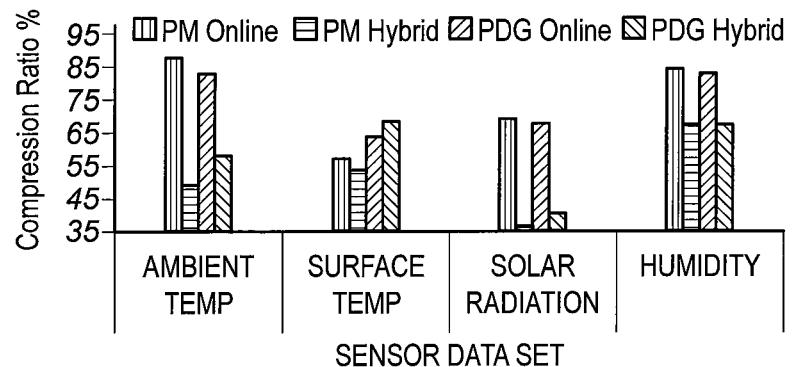

FIGS. 19A, 19B, and 19C respectively show compression ratios for LIS traces, event traces, and sensor data from glacier monitoring deployment. "Online" data are comparative; "Hybrid" data are inventive.

To assert the benefits of our techniques beyond control-flow tracing, we applied them on different kinds of traces and sensor data. Since we are interested in compression ratio, we simulated online and hybrid algorithms on PC as follows. We implemented both the Online and Hybrid compression algorithms as well as a small input simulator (SIS) in Python. SIS splits the input trace into multiple small files of 192 bytes (last file may be less than 192) and feed these to compression algorithms and combines the compressed output to form the final compressed file. It uncompresses the final compressed file output to verify the result. We used the first half of the trace to mine patterns offline for hybrid algorithms Log Instrumentation Specification (LIS) is a runtime logging framework designed specifically for WSN debugging. It provides a language and runtime to gather runtime information efficiently by using local namespaces and bit-aligned logging. LIS has built-in support to capture the function call as well as intraprocedural control-flow paths.

We ported LIS to work on TinyOS Lx and modified it to write the trace into flash. We used ATEMU emulator to collect the uncompressed function call and intraprocedural control-flow traces. We used SIS to compress the traces using both FCM and LZW algorithms. Due to space, we show the results only for one component and all components cases.

The compression ratio results are shown for hybrid (Hybrid) and online (Online) algorithms as shown in FIG. 19A. We observe that Hybrid approach improves the compression ratio significantly. For FCM, the improvement in compression ratio due to Hybrid over Online ranges from 48.17% (lrx-Main) to 64.15% (sense-All) and the average is 54.74%. Similarly, for LZW, the improvement ranges from 20.64% (blink-Main) to 76.48% (sense-All) and the average is 50.14%. Based on our earlier results, we conclude that the low compression ratio reduces the energy overhead due to tracing significantly.

Event traces have been used for WSN debugging. We manually instrumented code to record events such as the ones used in Dustminer. An event contains a timestamp, event id, and parameters. Unlike control-flow traces event traces have data values and the timestamps associated with the events, which reduce the opportunities for compression.

We recorded asynchronous events, timer events, message events and any important events inside tasks by manually instrumenting the code for 15 minute runs of all benchmarks except lrx, which is too big to manually instrument. We compressed the trace using SIS and LZW algorithm to get the compression ratio, which is shown in FIG. 19B. We observe that the improvement in compression ratio due to Hybrid over Online ranges from 6% to 21% and the average is 13%. While the improvement is modest, such improvement is obtained for highly varying data.

In addition to execution traces, Prius can be applied to other kinds of data such as sensor data. Our initial results are encouraging. Often times, the sensor data can be compressed well using lossy domain specific techniques such as averaging or discarding values within thresholds. We observe that Prius complements these techniques and can be applied if the sensor data does not evolve significantly We used two sensor data sets collected from two glacier monitoring deployments, namely, Plaine Morte glacier (PM) and Patouilee des glacier (PDG) using SensorScope in 2007/08 by Ingelrest et al. Both data sets contained data from 4 sensors, namely, ambient temperature, surface temperature, solar radiation, humidity. PM deployment had 13 locations while PDG deployment had 9 locations.

We compressed all four sensor data using SIS and computed the average compression ratio across locations for each sensor. We used LZW algorithm for comparison. The results in FIG. 19C show that except for PDG surface temperature, Hybrid compresses the sensor data very well. The improvement in compression ratio due to Hybrid over Online for solar radiation is 40% (PDG) and 47% (PM), for ambient temperature is 30% (PDG) and 44% (PM), for humidity is 18% (PDG) and 20% (PM), and for surface temperature it is 6% (PM) and −7% (PDG). For PDG surface temperature, Hybrid reduces the compression ratio, which could be due to anomalous data.

Some networks may experience trace divergence. If the trace generated is not present in the program memory table, then no compression happens and it is encoded as misprediction, which usually costs more bits than the entry itself.

As our results show, mispredictions are rare. However, when the trace significantly diverges from the table in program memory and compression ratio falls below a threshold, a small footprint online compression technique such as SLZW can act as a second layer compression.

Trace divergence can originate from, e.g., environmental or other changes that reduce the correspondence between the trace data and the training data. The processor in a node 100 can monitor the space savings due to compression of the data (one minus the quotient of the uncompressed size and the compressed size), and can retrain if the savings drops below a selected threshold. Retraining can include running the compression algorithm to update the table, e.g., stored in a rewriteable memory such as a EEPROM or Flash memory, using existing trace data, or requesting a new table from a server or other node (and optionally providing trace data to the server or node to use in the retraining).

Network effects can benefit some aspects. When the traces are transmitted on the radio, the local energy savings due to compression multiplies with every hop between the node and the base station. Since the reliability of a multi-hop network decreases significantly with the number of hops, retransmissions are not uncommon. By sending compressed data, the number of packets transmitted including retransmissions can be reduced significantly resulting in huge energy gains and less network congestion, as also noted by Sadler et al.

Various aspects of trace compression described herein exploit the fact that WSN computations are highly repetitive and do not evolve much over time to propose a novel generic hybrid trace compression technique, called Prius that is suitable for WSNs. Our technique uses an offline training phase to learn repeating patterns and to drive the online compression. Various aspects use program memory to store the mined patterns in the form of efficient data structures for faster, inexpensive lookups. Our results show that Prius can yield significant energy savings over straightforward adaptations of established compression techniques prior trace compression techniques.

Various aspects can slightly adapt the patterns mined offline to cope with any significant changes at run-time. More specifically, the idea is that the compression algorithm in the online phase dynamically triggers a pattern adaptation engine if the compression ratio drops below a given threshold.

Prius performs well when the input data has significant repetitions and do not evolve much over a period of time. The traces generated by TinyTracer generally exhibit these characteristics as the control-flow of sensor networks is highly repetitive and the repetitions do not evolve much over time. Exemplary results of compression of control-flow traces with Prius are discussed above.

Control-flow traces can be produced and stored in association with network traces. Control-flow traces can be compressed using Prius. Both control-flow and network traces can be compressed with Prius.

In various aspects, a method of compressing data includes receiving a compression table corresponding to a set of training data, the compression table produced by executing a table-driven compression algorithm to compress the set of training data; storing the compression table in a nonvolatile memory; and automatically executing a hybridized version of the table-driven compression algorithm using a processor and the stored compression table to compress the data, wherein the hybridized version considers the compression table to be read-only. The table-driven compression algorithm can be, e.g., FCM or LZW, as described above. The received compression table can be automatically transformed to a lookup-efficient form before storing the transformed compression table in the nonvolatile memory. The form can be, e.g., a hash table for FCM or a prefix tree for LZW. Various aspects can further include decompressing the data, e.g., on a desktop computer.

In various aspects, a method of preparing data includes automatically performing the following steps using a processor: executing a table-driven compression algorithm to compress a set of training data, so that a compression table is produced; and transforming the compression table into a lookup-efficient form. Steps described in the preceding paragraph can also be used with these aspects.

A network device can include a network interface, a memory configured to store data, and a processor adapted to compress the stored data as noted above and to transmit the compressed data via the network interface. The network device can include a sensor, the memory data can be sensor data, and the processor can receive data from the sensor and compress that data. The data can include control flow trace data, event trace data, power trace data, or function call trace data. Various methods and devices herein can process both control-flow trace data and network trace data.

FIG. 20 is a high-level diagram showing the components of an exemplary data-processing system for analyzing data and performing other analyses described herein, and related components. The system includes a processor 2086, a peripheral system 2020, a user interface system 2030, and a data storage system 2040. The peripheral system 2020, the user interface system 2030 and the data storage system 2040 are communicatively connected to the processor 2086. Processor 2086 can be communicatively connected to network 50 (shown in phantom), e.g., the Internet or an X.25 network, as discussed below. Processor 2086, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs). Processor 2086 can include Harvard-architecture components, modified-Harvard-architecture components, or Von-Neumann-architecture components.

Processor 2086 can implement processes of various aspects described herein, e.g., processes shown in FIG. 10 or described in Tables 1, 2, 4, or 6, or combinations thereof. Processor 2086 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise.

The phrase "communicatively connected" includes any type of connection, wired or wireless, for communicating data between devices or processors. These devices or processors can be located in physical proximity or not. For example, subsystems such as peripheral system 2020, user interface system 2030, and data storage system 2040 are shown separately from the data processing system 2086 but can be stored completely or partially within the data processing system 2086.

The peripheral system 2020 can include or interface with one or more devices configured to provide digital content records to the processor 2086. For example, the peripheral system 2020 can include digital still cameras, digital video cameras, or other data processors. For example, the peripheral system 2020 can interface with sensor 2022 to read sensor data and provide the sensor data to processor 2086. The processor 2086, upon receipt of digital content records from a device in the peripheral system 2020, can store such digital content records in the data storage system 2040.

The user interface system 2030 can include a mouse, a keyboard, another computer (connected, e.g., via a network or a null-modem cable), or any device or combination of devices from which data is input to the processor 2086. The user interface system 2030 also can include a display device, a processor-accessible memory, or any device or combination of devices to which data is output by the processor 2086. The user interface system 2030 and the data storage system 2040 can share a processor-accessible memory.

In various aspects, processor 2086 includes or is connected to communication interface 2015 that is coupled via network link 2016 (shown in phantom) to network 50. For example, communication interface 2015 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 2015 sends and receives electrical, electromagnetic or optical signals that carry digital or analog data streams representing various types of information across network link 2016 to network 50. Network link 2016 can be connected to network 50 via a switch, gateway, hub, router, or other networking device.

Processor 2086 can send messages and receive data, including program code, through network 50, network link 2016 and communication interface 2015. For example, a server can store requested code for an application program (e.g., a JAVA applet) on a tangible non-volatile computer-readable storage medium to which it is connected. The server can retrieve the code from the medium and transmit it through network 50 to communication interface 2015. The received code can be executed by processor 2086 as it is received, or stored in data storage system 2040 for later execution.

Data storage system 2040 can include or be communicatively connected with one or more processor-accessible memories configured to store information. The memories can be, e.g., within a chassis or as parts of a distributed system. The phrase "processor-accessible memory" is intended to include any data storage device to or from which processor 2086 can transfer data (using appropriate components of peripheral system 2020), whether volatile or non-volatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 2040 can be a tangible non-transitory computer-readable storage medium, i.e., a non-transitory device or article of manufacture that participates in storing instructions that can be provided to processor 2086 for execution.

In an example, data storage system 2040 includes code memory 2041, e.g., a RAM, and disk 2043, e.g., a tangible computer-readable rotational storage device such as a hard drive. Computer program instructions are read into code memory 2041 from disk 2043. Processor 2086 then executes one or more sequences of the computer program instructions loaded into code memory 2041, as a result performing process steps described herein. In this way, processor 2086 carries out a computer implemented process. For example, steps of methods described herein, blocks of the flowchart illustrations or block diagrams herein, and combinations of those, can be implemented by computer program instructions. Code memory 2041 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Furthermore, various aspects herein may be embodied as computer program products including computer readable program code stored on a tangible non-transitory computer readable medium Such a medium can be manufactured as is conventional for such articles, e.g., by pressing a CD-ROM. The program code includes computer program instructions that can be loaded into processor 2086 (and possibly also other processors), to cause functions, acts, or operational steps of various aspects herein to be performed by the processor 2086 (or other processor). Computer program code for carrying out operations for various aspects described herein may be written in any combination of one or more programming language(s), and can be loaded from disk 2043 into code memory 2041 for execution. The program code may execute, e.g., entirely on processor 2086, partly on processor 2086 and partly on a remote computer connected to network 50, or entirely on the remote computer.

In view of the foregoing discussion of CADeT and Prius, various aspects provide synchronization and compression of trace data. A technical effect is to provide more trace data, or more-accurately-timed trace data, so that failures in a network can be debugged. Trace buffers can hold a representation of data packets sent or received. The representation can be, e.g., a copy or subset of the data of the packet. A technical effect of various aspects is to provide a visual indication, e.g., in user interface system 2030, of trace data or to provide a visual indication, derived from trace data, of network or node activity. Exemplary visual representations are shown in plots 311, 312, 321, 322, 331 (FIGS. 3A-3C).

The invention is inclusive of combinations of the aspects described herein. References to "a particular aspect" (or "embodiment" or "version") and the like refer to features that are present in at least one aspect of the invention. Separate references to "an aspect" or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

The invention claimed is:

1. A method of compressing a dataset, the dataset comprising at least sensor data or other data representing the runtime behavior of a computing system, the method comprising performing the following steps using a processor of the computing system:

storing a compression table in a nonvolatile memory to provide a read-only compression table, wherein the compression table corresponds to results of processing a set of training data using a table-driven compression algorithm and the compression table is different from a compressed string output by the table-driven compression algorithm; and after storing the compression table in the nonvolatile memory, compressing the dataset using the read-only compression table according to the table-driven compression algorithm to provide a compressed set of data, wherein:

the dataset differs from the set of training data;
the read-only compression table is accessed in a read-only manner during compression of the dataset;
the set of training data is not stored in the nonvolatile memory; and
compressing the dataset comprises:
determining a portion of the dataset;
reading, from the read-only compression table, a pattern corresponding to the portion of the dataset; and
determining a portion of the compressed set of data based at least in part on the pattern, wherein the portion of the compressed set of data represents the portion of the dataset; and after compressing the dataset:
determining a second dataset comprising at least sensor data or other data representing the runtime behavior of the computing system; and
compressing the second dataset using the read-only compression table according to the table-driven compression algorithm to provide a second compressed set of data, wherein:
the read-only compression table is accessed in a read-only manner during compression of the second dataset; and
compressing the second dataset comprises:
determining a portion of the second dataset;
reading, from the read-only compression table, a second pattern, the second pattern corresponding to the portion of the second dataset; and
determining a portion of the second compressed set of data based at least in part on the second pattern, wherein the portion of the second compressed set of data represents the portion of the second dataset.

2. The method according to claim 1, wherein the table-driven compression algorithm is a finite-context-method or Lempel-Ziv-Welch algorithm.

3. The method according to claim 1, further comprising, before storing the compression table:
receiving a pre-table; and
transforming the pre-table to a lookup-efficient form to provide the compression table.

4. The method according to claim 3, wherein the table-driven compression algorithm uses fixed-length sequences of input data and the transforming includes determining a hash table mapping values of the sequences to corresponding predictions.

5. The method according to claim 3, wherein the table-driven compression algorithm uses a dictionary of patterns of values of input data and the transforming includes determining a trie of patterns in the dictionary, wherein nodes of the trie store entries in the dictionary and edges of the trie are labeled with corresponding ones of the values of the input data.

6. The method according to claim 1, further comprising storing the compressed set of data in a processor-accessible memory.

7. The method according to claim 1, further comprising transmitting the compressed set of data via a network interface.

8. The method according to claim 1, further comprising repeating the storing and compressing steps in order with respect to a second compression table different from the compression table.

9. The method according to claim 1, further comprising, after compressing the dataset, decompressing the compressed set of data using the read-only compression table.

10. The method according to claim 1, further comprising determining the dataset including at least one control-flow trace data element and at least one network trace data element.

11. A network device, comprising:
a nonvolatile memory; and
a processor configured to:
store a compression table in the nonvolatile memory to provide a read-only compression table, wherein:
the compression table corresponds to results of processing a set of training data using a table-driven compression algorithm;
the compression table is different from a compressed string output by the table-driven compression algorithm; and
the processor does not store the set of training data in the memory;
subsequent to storing the compression table in the memory, compress a dataset using the read-only compression table according to the table-driven compression algorithm to provide a compressed set of data, wherein:
the dataset comprises at least sensor data or other data representing the runtime behavior of the network device;
the dataset differs from the training data;
the read-only compression table is accessed in a read-only manner during the compressing of the dataset; and
compressing the dataset comprises:
determining a portion of the dataset;
reading, from the read-only compression table, a pattern corresponding to the portion of the dataset; and
determining a portion of the compressed set of data based at least in part on the pattern, wherein the portion of the compressed set of data represents the portion of the dataset; and after compressing the dataset:
determine a second dataset comprising at least sensor data or other data representing the runtime behavior of the computing system; and
compress the second dataset using the read-only compression table according to the table-driven compression algorithm to provide a second compressed set of data, wherein:
the read-only compression table is accessed in a read-only manner during compression of the second dataset; and
compressing the second dataset comprises:
determining a portion of the second dataset;

reading, from the read-only compression table, a second pattern, the second pattern corresponding to the portion of the second dataset; and
determining a portion of the second compressed set of data based at least in part on the second pattern, wherein the portion of the second compressed set of data represents the portion of the second dataset.

12. The network device according to claim 11, further comprising a sensor, wherein the processor is further configured to receive sensor data from the sensor and determine the dataset including the received sensor data.

13. The network device according to claim 11, wherein the dataset includes an element selected from the group consisting of a control flow trace data element, an event trace data element, a power trace data element, and a function call trace data element.

14. The network device according to claim 11, wherein the processor is further configured to determine the dataset including at least one control-flow trace data element and at least one network trace data element.

15. The method according to claim 1, wherein the dataset comprises trace data and the training data comprises training trace data.

16. The network device according to claim 11, wherein the training data is training trace data and the dataset comprises trace data.

17. The network device according to claim 11, wherein:
the network device further comprises a network interface; and
the processor is further configured to transmit the compressed data via the network interface.

18. The network device according to claim 11, wherein the processor is further configured to, before storing the compression table:
receive a pre-table; and
transform the pre-table to a lookup-efficient form to provide the compression table.

19. The network device according to claim 11, wherein:
the table-driven compression algorithm uses fixed-length sequences of input data; and
the transforming includes determining a hash table mapping values of the sequences to corresponding predictions.

20. The network device according to claim 11, wherein:
the table-driven compression algorithm uses a dictionary of patterns of values of input data;
the transforming includes determining a trie of patterns in the dictionary;
nodes of the trie store entries in the dictionary; and
edges of the trie are labeled with corresponding ones of the values of the input data.

21. The network device according to claim 11, wherein the table-driven compression algorithm is a finite-context-method or Lempel-Ziv-Welch algorithm.

22. At least one tangible, non-transitory computer-readable medium comprising computer program instructions that, when executed by at least one processor, cause the at least one processor to perform operations comprising:
storing a compression table in a nonvolatile memory to provide a read-only compression table, wherein the compression table corresponds to results of processing a set of training data using a table-driven compression algorithm and the compression table is different from a compressed string output by the table-driven compression algorithm; and
after storing the compression table in the nonvolatile memory, compressing a dataset using the read-only compression table according to the table-driven compression algorithm to provide a compressed set of data, wherein:
the dataset comprises at least sensor data or other data representing the runtime behavior of a computing system;
the dataset differs from the set of training data;
the read-only compression table is accessed in a read-only manner during compression of the dataset;
the set of training data is not stored in the nonvolatile memory; and
compressing the dataset comprises:
determining a portion of the dataset;
reading, from the read-only compression table, a pattern corresponding to the portion of the dataset; and
determining a portion of the compressed set of data based at least in part on the pattern, wherein the portion of the compressed set of data represents the portion of the dataset; and
after compressing the dataset:
determining a second dataset comprising at least sensor data or other data representing the runtime behavior of the computing system; and
compressing the second dataset using the read-only compression table according to the table-driven compression algorithm to provide a second compressed set of data, wherein:
the read-only compression table is accessed in a read-only manner during compression of the second dataset; and
compressing the second dataset comprises:
determining a portion of the second dataset;
reading, from the read-only compression table, a second pattern, the second pattern corresponding to the portion of the second dataset; and
determining a portion of the second compressed set of data based at least in part on the second pattern, wherein the portion of the second compressed set of data represents the portion of the second dataset.

23. The at least one tangible, non-transitory computer-readable medium according to claim 22, further comprising, before storing the compression table:
receiving a pre-table; and
transforming the pre-table to a lookup-efficient form to provide the compression table.

24. The at least one tangible, non-transitory computer-readable medium according to claim 23, wherein the table-driven compression algorithm uses fixed-length sequences of input data and the transforming includes determining a hash table mapping values of the sequences to corresponding predictions.

25. The at least one tangible, non-transitory computer-readable medium according to claim 23, wherein the table-driven compression algorithm uses a dictionary of patterns of values of input data and the transforming includes determining a trie of patterns in the dictionary, wherein nodes of the trie store entries in the dictionary and edges of the trie are labeled with corresponding ones of the values of the input data.

26. The at least one tangible, non-transitory computer-readable medium according to claim 22, the operations further comprising transmitting the compressed set of data via a network interface.

* * * * *